(12) United States Patent
Kobayashi et al.

(10) Patent No.: US 8,829,830 B2
(45) Date of Patent: Sep. 9, 2014

(54) SYNCHRONOUS MACHINE CONTROL APPARATUS

(75) Inventors: Takahiko Kobayashi, Chiyoda-ku (JP); Kiyoharu Anzai, Chiyoda-ku (JP); Noriyuki Wada, Chiyoda-ku (JP); Daiki Matsuura, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 276 days.

(21) Appl. No.: 13/528,429

(22) Filed: Jun. 20, 2012

(65) Prior Publication Data

US 2013/0088179 A1    Apr. 11, 2013

(30) Foreign Application Priority Data

Oct. 11, 2011    (JP) ................................. 2011-223620

(51) Int. Cl.
*H02P 21/00*    (2006.01)
*H02P 21/14*    (2006.01)
*H02P 21/06*    (2006.01)

(52) U.S. Cl.
CPC .............. *H02P 21/06* (2013.01); *H02P 21/141* (2013.01)
USPC ................. 318/400.02; 318/400.01; 318/799; 318/800; 318/801; 318/809; 318/810; 318/609; 318/608; 318/700

(58) Field of Classification Search
CPC ..... H02K 1/2766; H02K 15/03; H02K 1/246; H02P 21/141; H02P 2203/09; H02P 21/146
USPC ............... 318/400.02, 400.01, 799, 599, 608, 318/609, 700, 801, 809, 810
See application file for complete search history.

(56) References Cited

U.S. PATENT DOCUMENTS

| | | | | |
|---|---|---|---|---|
| 6,825,637 B2* | 11/2004 | Kinpara et al. | ............... | 318/700 |
| 7,554,281 B2* | 6/2009 | Satake et al. | ................... | 318/432 |
| 7,852,039 B2* | 12/2010 | Kinpara et al. | ............... | 318/778 |
| 8,198,840 B2* | 6/2012 | Hexamer | ................. | 318/400.02 |
| 8,525,454 B2* | 9/2013 | Kimpara et al. | ......... | 318/400.02 |
| 2012/0001573 A1 | 1/2012 | Kimpara et al. | | |

FOREIGN PATENT DOCUMENTS

| | | |
|---|---|---|
| JP | 3570467 B2 | 9/2004 |
| JP | 3640120 B2 | 4/2005 |
| WO | 2010/109528 A1 | 9/2010 |

* cited by examiner

*Primary Examiner* — Rita Leykin
(74) *Attorney, Agent, or Firm* — Sughrue Mion, PLLC; Richard C. Turner

(57) ABSTRACT

A control command generator that generates an armature interlinkage flux command and a torque current command by a torque command, a rotation speed, and an operation target command, includes a first flux command generator generating a first flux command by the toque command or the torque current command, a second flux generator generating a second flux command by the torque command or the torque current command and the rotation speed of the synchronous machine, a command allocation setting unit setting an allocation coefficient equivalent to an allocation ratio of the two first and second flux commands by the operation target command, a flux command adjuster outputting an armature interlinkage flux command by the two flux commands and the allocation coefficient, and a torque current command generator generating the torque current command by the torque command and the armature interlinkage flux command.

14 Claims, 23 Drawing Sheets

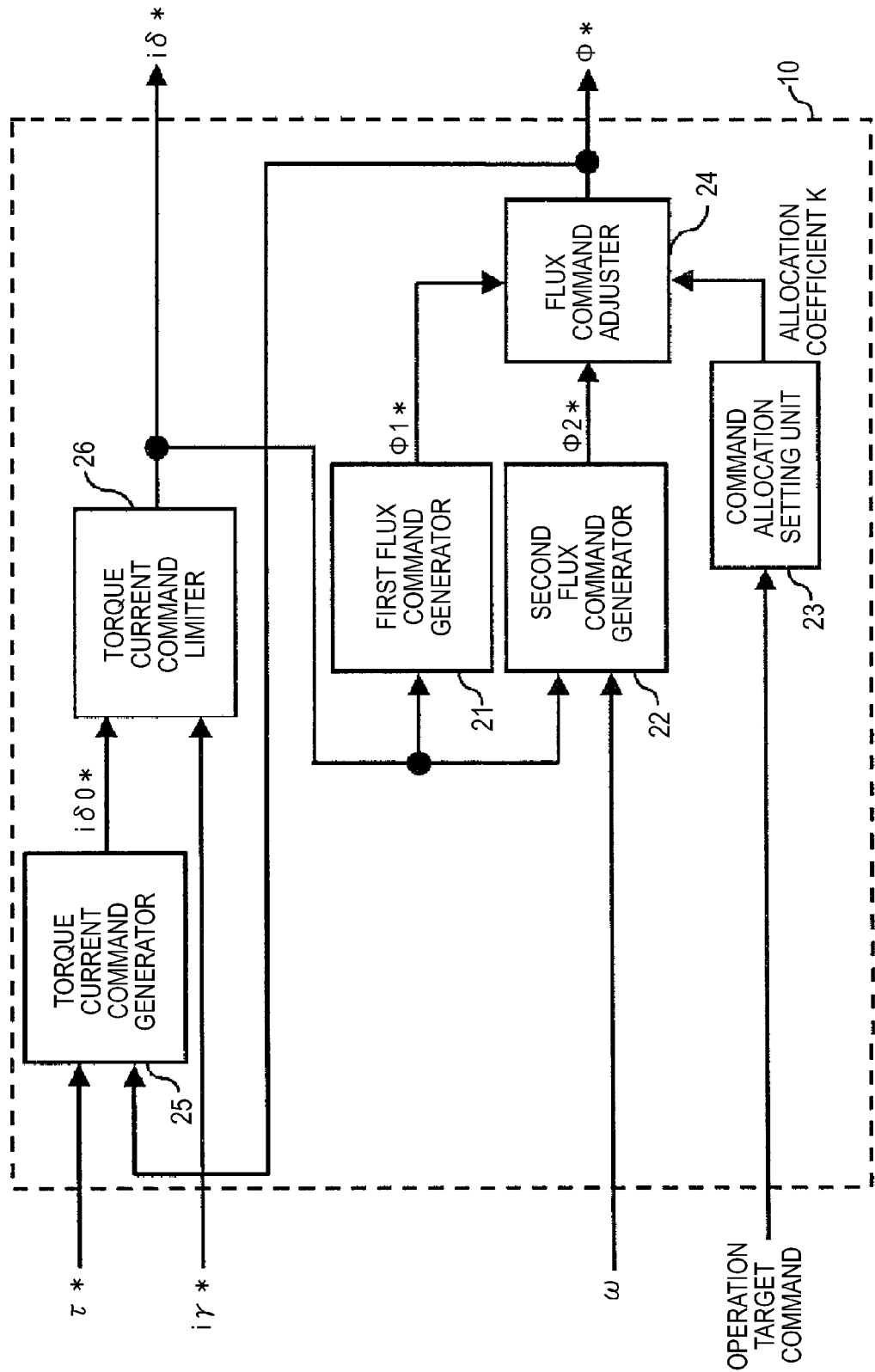

US 8,829,830 B2

SYNCHRONOUS MACHINE CONTROL APPARATUS

BACKGROUND OF THE INVENTION

1. Field of the Invention

The present invention relates to a synchronous machine control apparatus equipped with a power converter that rotary drives a synchronous machine.

2. Description of the Related Art

Synchronous machines include a permanent magnet synchronous motor having a permanent magnet in a rotor and a reluctance motor that generates a torque by utilizing magnetic saliency of a rotor. When such a synchronous machine is controlled by a synchronous machine control apparatus having a power converter, such as an inverter, control widely performed in the related art is to orient an armature current vector in a certain phase direction with respect to the rotor. For example, in the case of a permanent magnet synchronous machine in the related art, an absolute value of an armature current vector is controlled in proportion to a desired torque by controlling the armature current vector to be oriented in a direction orthogonal to a permanent magnet flux axis of the rotor. Meanwhile, in the case of the reluctance motor, it is known that an absolute value of the armature current vector is not proportional to an output torque and it is therefore difficult to perform torque control with a high degree of accuracy by the control method in the related art.

Further, when a rotation speed of the permanent magnet synchronous motor increases, an inductive voltage induced by a permanent magnet flux causes an armature voltage to rise and the armature voltage eventually exceeds a voltage that can be outputted from a power converter, such as an inverter. In order to prevent such an inconvenience, flux weakening control is performed to reduce an armature interlinkage flux by generating a negative armature current vector called a weakening current in a direction of the permanent magnet flux axis. It should be noted, however, that an armature voltage varies with an output torque even when the weakening current is the same. It is therefore difficult to control an armature voltage to have a desired value according to the magnitude of a torque by the control method in the related art.

An example of a synchronous machine control apparatus configured to solve this problem is disclosed, for example, in U.S. Pat. No. 7,554,281 (Patent Document 1). The disclosed synchronous machine control apparatus includes: a torque current computing unit that computes a torque current command that is a torque component of an armature current command on the basis of a torque command and a flux command; a torque current limit generator that generates a maximum torque current command value that can be generated on the basis of a magnetizing current command that is a magnetizing component of the armature current command and a current limit value of a power converter in such a manner that the armature current does not exceed the current limit value; a torque current command generator that is formed of three components forming a limiter that imposes a limitation on the torque current command according to the maximum torque current command value; a flux command generator that computes a flux command according to the torque current command from the torque current command generator; a flux computing unit that computes an armature interlinkage flux on the basis of an armature current of the synchronous machine alone or the armature current and an armature voltage; and a flux controller that generates a magnetizing current command so that the flux command and the armature interlinkage flux are consistent with each other and inputs the magnetizing current command into the torque current command generator.

According to the configuration above, by calculating the torque current command with reference to the flux command and the magnetizing current command, it becomes possible to take the limit of an output current of the power converter into consideration, and also by calculating the flux command with reference to the torque current command, it becomes possible to generate a suitable flux command that reflects a fluctuation of the torque current command caused by limiting the output current as described above.

Another example of the similar control apparatus is disclosed, for example, in Japanese Patent No. 3640120 (Patent Document 2). This control apparatus generates an armature interlinkage flux command instructing the synchronous machine to generate desired torque and armature voltage and an armature current (torque current) command orthogonal to the armature interlinkage flux command. Meanwhile, the control apparatus determines a current (magnetizing current) command in a flux axis direction so that an armature interlinkage flux found by a flux computation on the basis of the armature current becomes consistent with the armature interlinkage flux command. Thereafter, the control apparatus generates a current command of a rotary biaxial coordinate (hereinafter, referred to as the d-q axes) rotating at an angular frequency on the basis of the torque current command and the magnetizing current command.

According to this configuration, it becomes possible to improve control characteristics by linearizing a relation between a torque and a current of the synchronous machine and to reduce a capacity of the power converter by directly controlling a terminal voltage.

Still another example of the similar control apparatus is disclosed, for example, in Japanese Patent No. 3570467 (Patent Document 3). This control apparatus includes a unit that computes, on the basis of a torque command value and an armature interlinkage flux command value, a current command value with which a torque and an armature interlinkage flux can be controlled linearly. When the torque command value is smaller than a predetermined value, the interlinkage flux command value is used as an increasing function of the torque command value whereas when the torque command value is greater than the predetermined value, the interlinkage flux command value is limited to a certain value equal to or less than an upper limit value.

According to this configuration, it becomes possible to improve control characteristics by linearizing a relation between a torque and a current of the synchronous machine and to avoid magnetic saturation caused by limiting the upper limit of the interlinkage flux.

Patent Document 1: U.S. Pat. No. 7,554,281 (FIG. 1 and the description thereof)
Patent Document 2: Japanese Patent No. 3640120 (FIG. 3 and the description thereof)
Patent Document 3: Japanese Patent No. 3570467 (FIG. 5 and the description thereof)

Patent Document 1 refers to the configuration to output a flux command with reference to the torque current command in such a manner that a torque reaches a maximum value under the condition that magnitude of a current is constant. However, a condition that allows a torque to reach a maximum value under the condition that magnitude of a current is always constant is not the same as a condition that allows conversion efficiency (conversion efficiency of the synchronous machine or the power converter alone or total conversion efficiency of the synchronous machine and the power converter) to reach a maximum level. In use with which there is a need to obtain a larger torque from a smaller current, it is desirable to set an operation target so that control is performed to allow a torque to reach a maximum value under the condition that magnitude of a current is constant. However, the control in this manner is not necessarily desirable all the time.

In cases where a temperature rise of the synchronous machine becomes a problem, for example, where a cooling performance is poor or a synchronous machine has a permanent magnet synchronous machine inside, desirable control is to allow conversion efficiency of the synchronous machine to reach a maximum level so that heat generation in the synchronous machine is suppressed, or where there is a need to consider heat resistance of a switching device forming the power converter of the synchronous machine, desirable control is to suppress heat generation in the power converter. It is therefore difficult for the control device of Patent Document 1 to flexibly address these cases.

The control apparatuses of Patent Documents 2 and 3 can directly control a torque current and an armature interlinkage flux with a high degree of accuracy in consideration of magnetic saturation and a maximum output voltage across the power converter. However, the torque current command and the flux command are generated to allow a torque to reach a maximum value under the condition that magnitude of a current is constant as in Patent Document 1. Hence, there is the same problem as that in Patent Document 1.

An operation target, such as the maximum conversion efficiency, varies from time to time with conditions (chiefly, temperatures) of the synchronous machine and the power converter. It is therefore necessary to provide a configuration that generates an operation target command that suits a situation online.

SUMMARY OF THE INVENTION

The invention is devised to solve the problems discussed above and has an object to provide a synchronous machine control apparatus that generates an operation target command that suits conditions (chiefly temperatures) of a synchronous machine and a power converter and constantly generates a control command (armature interlinkage flux command) that satisfies an operation target (maximum efficiency and minimum heat generation of the synchronous machine or the power converter) online in consideration of conversion efficiency of the synchronous machine.

A synchronous machine control apparatus according to an aspect of the invention controls an armature current of a synchronous machine on two axes including a γ axis in a generation direction of an armature interlinkage flux of the synchronous machine and a δ axis orthogonal to the γ axis, and includes: a voltage command generator that generates a voltage command according to a magnetizing current command as a current command in the γ-axis direction and a torque current command as a current command in the δ-axis direction; a power converter that converts a voltage across a power supply and applies the resulting voltage to the synchronous machine according to the voltage command; a current detector that detects the armature current of the synchronous machine; a position detector that estimates or detects a rotor position of the synchronous machine; a speed computing unit that computes a rotation speed of the synchronous machine on the basis of the rotor position; a flux computing unit that estimates an estimated armature interlinkage flux of the synchronous machine on the basis of the armature current and the voltage command; a magnetizing current command generator that generates the magnetizing current command on the basis of a difference between an armature interlinkage flux command and the estimated armature interlinkage flux; and a control command generator that generates the armature interlinkage flux command and the torque current command according to a torque command, the rotation speed, and an operation target command. The control command generator includes: a first flux command generator that generates a first flux command according to the torque command or the torque current command; a second flux command generator that generates a second flux command according to the torque command or the torque current command and the rotation speed; a command allocation setting unit that sets an allocation coefficient equivalent to an allocation ratio of two flux commands including the first flux command and the second flux command according to the operation target command; a flux command adjuster that outputs the armature interlinkage flux command according to the two flux commands and the allocation coefficient; and a torque current command generator that generates the torque current command according to the torque command and the armature interlinkage flux command.

The synchronous machine control apparatus configured as above is based on the fact that a suitable operation target varies with conditions of the synchronous machine and the power converter even under the condition that the torque command is the same, and therefore generates an operation target command that suits conditions of the synchronous machine and the power converter and then constantly generates a control command that satisfies an operation target online in consideration of conversion efficiency of the synchronous machine. Hence, there can be achieved an advantage that the synchronous machine can be driven with high efficiency while effectively suppressing a loss and heat generation in the synchronous machine or the power converter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a view showing an example of a configuration of a control command generator shown in FIG. 1;

DETAILED DESCRIPTION OF THE INVENTION

Hereinafter, preferred embodiments of a synchronous machine control apparatus of the invention will be described with reference to the drawings.

First Embodiment

Figure 1:
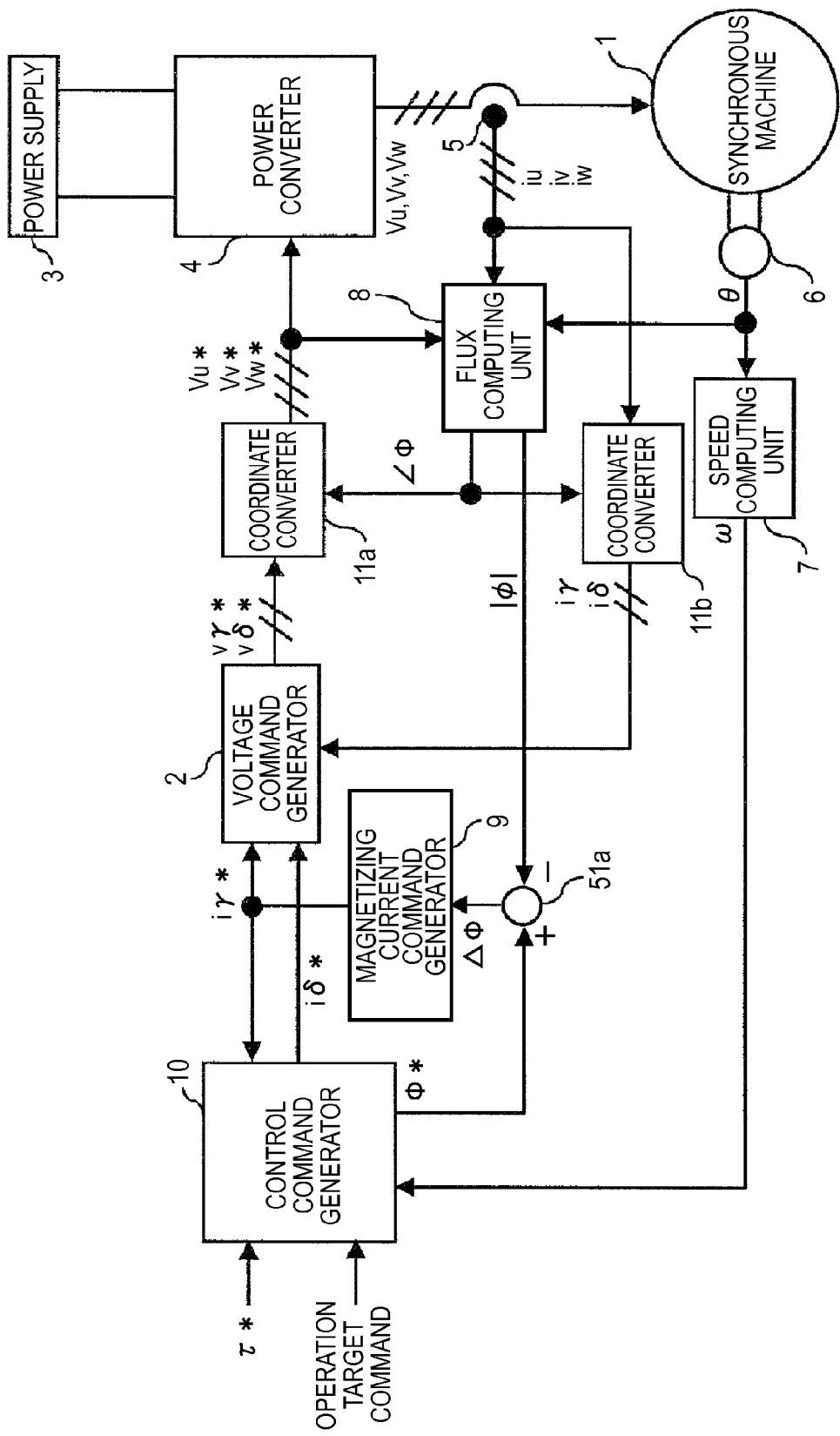
FIG. 1 is a view used to describe a synchronous machine control apparatus according to a first embodiment of the invention and showing a synchronous machine control system including a synchronous machine and a synchronous machine control apparatus.

A synchronous machine control apparatus according to a first embodiment of the invention will be described with reference to FIG. 1. FIG. 1 is a view used to describe the synchronous machine control apparatus of the first embodiment and it is a view showing a synchronous machine control system including a synchronous machine and a synchronous machine control apparatus.

Hereinafter, descriptions will be given to a configuration of the synchronous machine control apparatus that drives the synchronous machine of the first embodiment and to functions of components. An output end of a power converter that rotary drives the synchronous machine will be described first and then a flow up to generation of a voltage command at an input end of the power converter will be described sequentially.

The synchronous machine control apparatus that drives the synchronous machine 1 of the first embodiment is configured as follows. That is, a power converter 4 represented by an inverter and having a function of converting power supplied from a power supply 3 to multi-phase AC power is connected to an armature winding of the synchronous machine 1. The power converter 4 drives the synchronous machine 1 by applying a voltage to the synchronous machine 1 according to a voltage command obtained from a voltage command generator 2 described below. Consequently, an output current is generated in the armature winding of the synchronous machine 1. The power supply 3 is a power supply or a battery that outputs a DC voltage and the one that obtains a DC voltage from a single- or three-phase AC power supply by means of a known converter is also included as an example of the power supply 3.

A current in the armature winding (hereinafter, referred to as the armature current), which is an output current of the synchronous machine 1, is detected by a current detector 5 represented by a current sensor. In a case where the synchronous machine 1 is a three-phase rotating machine, the current detector 5 may be configured to detect output currents in all the three phases from the synchronous machine 1 or to detect output currents in two phases and find an output current iw in one phase (for example, a phase w) using the output currents iu and iv in the detected two phases in accordance with a relation expressed as iw=−iu−iv. Besides a method of directly detecting currents in the respective phases, the output current may be detected from a DC link current flowing between the power supply 3 and the power converter 4, which is a known technique.

A position detector 6 detects a rotor position θ of the synchronous machine 1 using a known resolver or encoder. A speed computing unit 7 performs a differential operation on the basis of the detected rotor position θ and calculates a rotation speed (electrical angular frequency) ω of the synchronous machine 1.

The term, "the rotor position θ of the synchronous machine 1", referred to herein means an angle in a north pole direction of a permanent magnet with respect to an axis set in reference to a u-phase armature winding in a case where the synchronous machine 1 is a permanent magnet synchronous machine. A d axis of a rotary biaxial coordinate (hereinafter, referred to as the d-q axes) rotating at a rotation speed (electrical angular frequency) ω of the synchronous machine 1 is generally set in the north-pole direction of the permanent magnet, and descriptions will be given below on this assumption. The q axis is set to a 90°-leading direction orthogonal to the d axis. Likewise, in a case where the synchronous machine 1 is of a wound-field type, the term means an angle in the north-pole direction of a field flux, which is generated when a current flows through a field winding, with respect to an axis set in reference to the u-phase armature winding. In this case, the d axis is set in the north-pole direction of the field flux. In this embodiment, let a γ axis be a generation direction of an armature interlinkage flux and a δ axis be a 90°-leading direction orthogonal to the γ axis.

A flux computing unit 8 estimates an estimated value of the armature interlinkage flux (hereinafter, referred to as the estimated armature interlinkage flux) on the basis of at least the output currents iu, iv, and iw of the synchronous machine 1 detected by the current detector 5 and a voltage command (Vu*, Vv*, and Vw* in the case of three-phase type) obtained by the voltage command generator 2 and a coordinate converter 11a both described below. More specifically, the flux computing unit 8 estimates an absolute value |Φ| of the estimated armature interlinkage flux and a phase ∠Φ of the estimated armature interlinkage flux. The term, "the phase ∠Φ of the estimated armature interlinkage flux", referred to herein means an angle in a direction of the estimated armature interlinkage flux (estimated γ axis direction) with respect to an axis set in reference to the u-phase armature winding.

Figure 2:
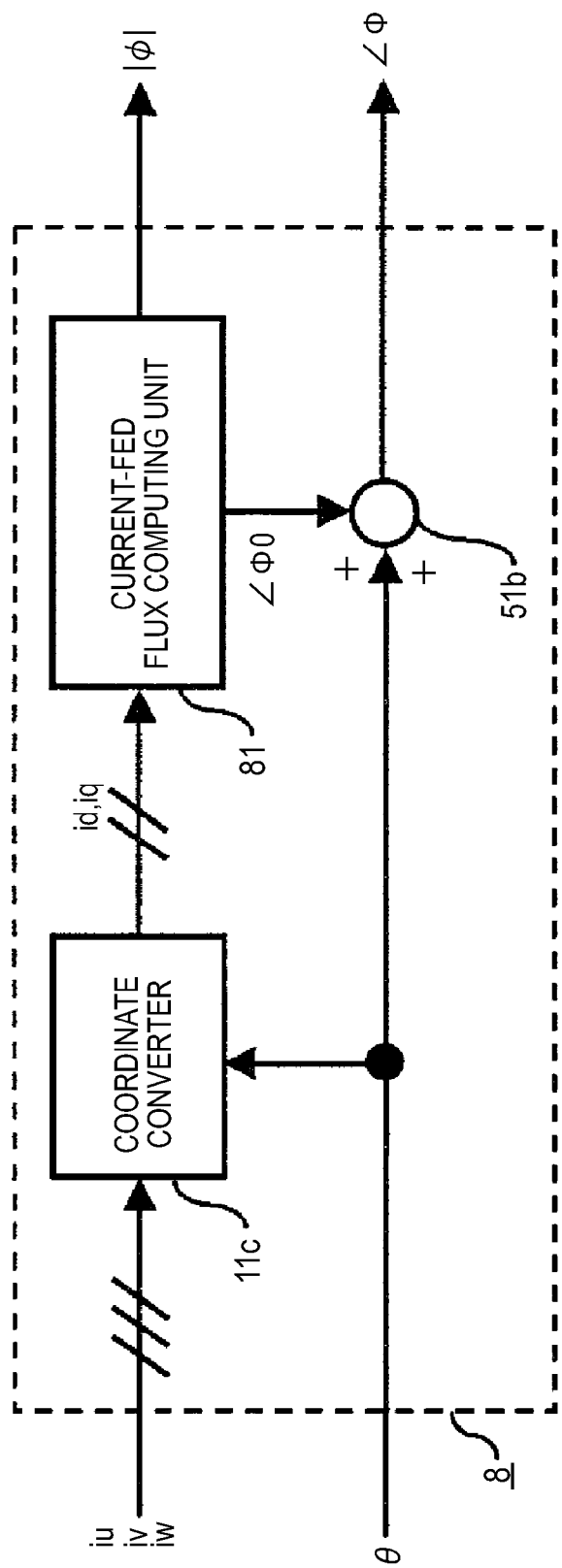
FIG. 2 is a view showing an example of a configuration of a flux computing unit shown in FIG. 1.

FIG. 2 is a view showing an example of the configuration of the flux computing unit 8 shown in FIG. 1. Referring to FIG. 2, a coordinate converter 11c converts the output currents iu, iv, and iw of the synchronous machine 1 to currents id and iq on the d-q axes on the basis of the rotor position θ by a computation in accordance with Equation (1) as follows.

$$\begin{pmatrix} id \\ iq \end{pmatrix} = \begin{pmatrix} \cos\theta & \sin\theta \\ -\sin\theta & \cos\theta \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} iu \\ iv \\ iw \end{pmatrix} \quad (1)$$

A current-fed flux computing unit 81 calculates an absolute value |Φ| of the estimated armature interlinkage flux and a phase ∠Φ of the estimated armature interlinkage flux on the basis of the currents id and iq on the d-q axes and outputs the calculation results.

In the synchronous machine 1 having a field (permanent magnet) flux Φm, a relation expressed as Equation (2) below is established between a current and an actual armature interlinkage flux.

Herein, Ld is inductance in the d-axis direction (hereinafter, referred to as the d-axis inductance), Lq is inductance in the q-axis direction (hereinafter, referred to as the q-axis inductance), Φd is a d-axis component of the actual armature interlinkage flux, Φq is a q-axis component of the actual armature interlinkage flux, pd0 is a d-axis component of the estimated armature interlinkage flux, and pq0 is a q-axis component of the estimated armature interlinkage flux. Herein, assume that the actual armature interlinkage flux obtained in accordance with Equation (2) below substantially coincides with the estimated armature interlinkage flux.

$$\begin{cases} \Phi d = Ld \cdot id + \Phi m \cong pd0 \\ \Phi q = Lq \cdot iq \cong pq0 \end{cases} \quad (2)$$

It should be noted that Φm=0 is given for a synchronous machine having no field (permanent magnet) flux.

The current-fed flux computing unit 81 calculates an absolute value |Φ| of the estimated armature interlinkage flux and a phase ∠Φ thereof in accordance with Equation (3) and Equation (4) below on the basis of the d-axis component pd0 and the q-axis component pq0 of the estimated armature interlinkage flux obtained in accordance with Equation (2) above on the assumption specified above, and outputs the calculation results.

$$|\Phi| = \sqrt{pd0^2 + pq0^2} \quad (3)$$

$$\angle\Phi = \tan^{-1}\left(\frac{pq0}{pd0}\right) + \theta \quad (4)$$
$$= \angle\Phi 0 + \theta$$

where $$\angle\Phi\theta = \tan^{-1}\left(\frac{pq0}{pd0}\right)$$

It is known that values of the d-q axes inductances Ld and Lq used for a computation in accordance with Equation (2) above vary with output currents of the synchronous machine 1 due to magnetic saturation. Hence, it may be configured in such a manner that a relation between the output currents (for example, the currents id and iq on the d-q axes) and the d-q axes inductances Ld and Lq is pre-stored in the form of an equation or a table, so that by varying the d-q inductances Ld and Lq according to the output currents, an error in flux estimation caused by an inductance fluctuation can be reduced. It goes without saying that a relation between the output currents and the estimated armature interlinkage fluxes (pd0, pq0) may be pre-stored in the form of an equation or a table so that the latter can be obtained directly from the former.

Figure 3:
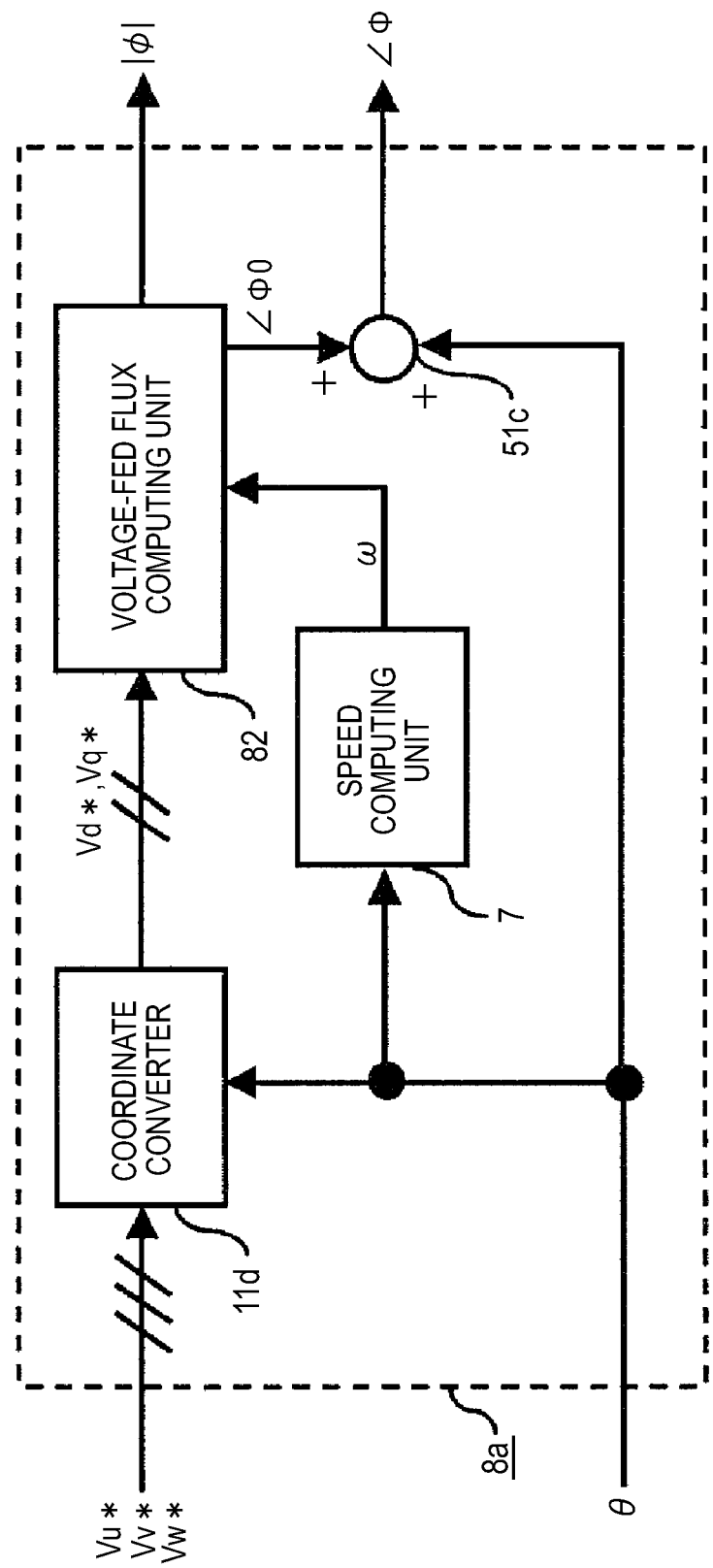
FIG. 3 is a view showing another example of the configuration of the flux computing unit shown in FIG. 1.

Referring to FIG. 1, a flux computing unit 8a described below may be used instead of the flux computing unit 8. FIG. 3 is a view showing an example of the configuration of the flux computing unit 8a. The flux computing unit 8a has a voltage-fed flux computing unit 82 instead of the current-fed flux computing unit 81 used in the flux computing unit 8.

Referring to FIG. 3, a coordinate converter 11d converts the voltage commands Vu*, Vv*, and Vw* to voltage commands Vd* and Vq* on the d-q axes on the basis of the rotor position θ by a computation in accordance with Equation (5) as follows.

$$\begin{pmatrix} Vd^* \\ Vq^* \end{pmatrix} = \begin{pmatrix} \cos\theta & \sin\theta \\ -\sin\theta & \cos\theta \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} Vu^* \\ Vv^* \\ Vw^* \end{pmatrix} \quad (5)$$

It should be noted, however, that there is a control computation lag time (wasted time) until the control computation on the basis of the values of the armature currents iu, iv, and iw of the synchronous machine 1 detected by the current detector 5 are reflected on the three-phase voltages Vu, Vv, and Vw outputted from the power converter 4. Hence, the coordinate converter 11d may perform coordinate conversion in consideration of such a control computation lag time by using a phase corrected by adding an amount of phase correction, θd1, found on the basis of the control computation lag time to the rotor position θ in Equation (5) above.

The speed computing unit 7 performs a differential operation on the basis of the detected rotor position θ in the same manner as above to calculate a rotation speed (electrical angular frequency) ω of the synchronous machine 1. The voltage-fed flux computing unit 82 calculates an absolute value of the estimated armature interlinkage flux and a phase |Φ| of the estimated armature interlinkage flux on the basis ∠Φ of the voltage commands Vd* and Vq* on the d-q axes and the currents id and iq on the d-q axes and outputs the calculation results.

In the synchronous machine 1, relations expressed as Equation (6) below are established among a voltage, a current, and an actual armature interlinkage flux. Herein, R is resistance (a resistance value of chiefly the resistance in the armature winding of the synchronous machine 1; in a case where wiring resistance between the synchronous machine 1 and the power converter 4 is not negligibly small, the wiring resistance is also taken into consideration) and s is a Laplace operator. An inverse of the Laplace operator s, 1/s, means time integration at a time.

$$\begin{cases} \Phi d = \dfrac{1}{\omega}\{Vq - (R + Lq \cdot s)iq\} \\ \Phi q = \dfrac{1}{\omega}\{Vd - (R + Ld \cdot s)id\} \end{cases} \quad (6)$$

In Equation (6) above, the term including the Laplace operator s can be ignored in a case where a current varies moderately. In this case, Equation (6) above is modified to Equation (7) below. When Equation (6) above is modified to Equation (7) below, the voltages Vd and Vq on the d-q axes are replaced with the voltage commands Vd* and Vq* on the d-q axes and the d-axis component Φd and the q-axis component Φq of the actual armature interlinkage flux are replaced with the d-axis component pd0 and the q-axis component pq0 of the estimated armature interlinkage flux to comply with actual computations.

$$\begin{cases} pd0 = \dfrac{1}{\omega}\{Vq^* - R \cdot iq\} \\ pq0 = \dfrac{1}{\omega}\{Vd^* - R \cdot id\} \end{cases} \quad (7)$$

It should be noted, however, that the voltages Vd and Vq on the d-q axes are 0 and pd0=pq0=0 is given before the driving of the synchronous machine 1 is started. Hence, as an initial value of pd0 when the driving of the synchronous machine 1 is started, it is preferable to give the voltage-fed flux computing unit 82 a value of the field (permanent magnet) flux in the presence of the field (permanent magnet) flux and 0 in the absence of the field (permanent magnet) flux. In Equation (7) above, in a case where the resistance R is relatively small in comparison with the other terms, the term including the resistance R may be ignored. In this case, information on the output currents of the synchronous machine 1 becomes unnecessary. Also, because the resistance R varies with a temperature of the synchronous machine 1, it may be configured in such a manner that a value of the resistance R is corrected by detecting a temperature of the synchronous machine 1.

In the computations by the flux computing units 8 and 8a, the detection values of the current detector 5 are used as the output currents iu, iv, and iw of the synchronous machine 1 and the voltage commands Vu*, Vv*, and Vw* are used as the voltages. However, values found by converting current commands iγ* and iδ* (current commands iγ* and iδ* will be described below) inputted into the voltage command generator 2 to three-phase currents (commands) may be used as the output currents. Also, voltages may be detected in a known manner so that voltage detection values thus detected are used as the voltages.

Further, a computation as the one performed by the flux computing unit 8a to find an absolute value |Φ| of the estimated armature interlinkage flux and a phase ∠Φ of the estimated armature interlinkage flux on the basis of the voltages may be performed as follows.

For example, a voltage drop across the resistance R caused by the currents iu, iv, and iw is subtracted from the voltage commands Vu*, Vv*, and Vw* and the resulting values are subjected to polar coordinate conversion. A value found by dividing an absolute value of the converted value by the rotation speed (electrical angular frequency) ω can be given as an absolute value |Φ| of the estimated armature interlinkage flux. Also, from or to the phase thus found, 90° is subtracted (in the case of ω>0) or to 90° is added (in the case of ω<0), and the resulting phase can be given as the phase ∠Φ of the armature interlinkage flux. Calculations are simpler in this method.

The flux computing unit 8 having the current-fed flux computing unit 81 as shown in FIG. 2 is capable of estimating a flux independently of a rotation speed. However, because the inductance values are used for a flux estimation, the flux computing unit 8 is susceptible to fluctuations of the characteristics of the synchronous machine 1 caused by magnetic saturation or the like. On the other hand, the flux computing unit 8a having the voltage-fed flux computing unit 82 as shown in FIG. 3 does not use the inductance values and is therefore unsusceptible to fluctuations of the characteristics of the synchronous machine 1. However, in a case where a rotation speed is low or an armature voltage is low, estimation accuracy may possibly be deteriorated due to influences of a disturbance.

As a method of solving these problems, a method of switching flux computing units as follows may be adopted. That is, the current-fed flux computing unit 81 and the voltage-fed flux computing unit 82 are used together. In a region in which a rotation speed is low or a voltage command (modulation percentage) is small, the current-fed flux computing unit 81 is chiefly used and the voltage-fed flux computing unit 82 is chiefly used when these factors increase. Further, in order to enable delicate switching, it is also possible to adopt a method of averaging outputs of the two types of the flux computing units while assigning weights to the outputs with reference to the rotation speed ω or the voltage command (modulation percentage).

Figure 4:
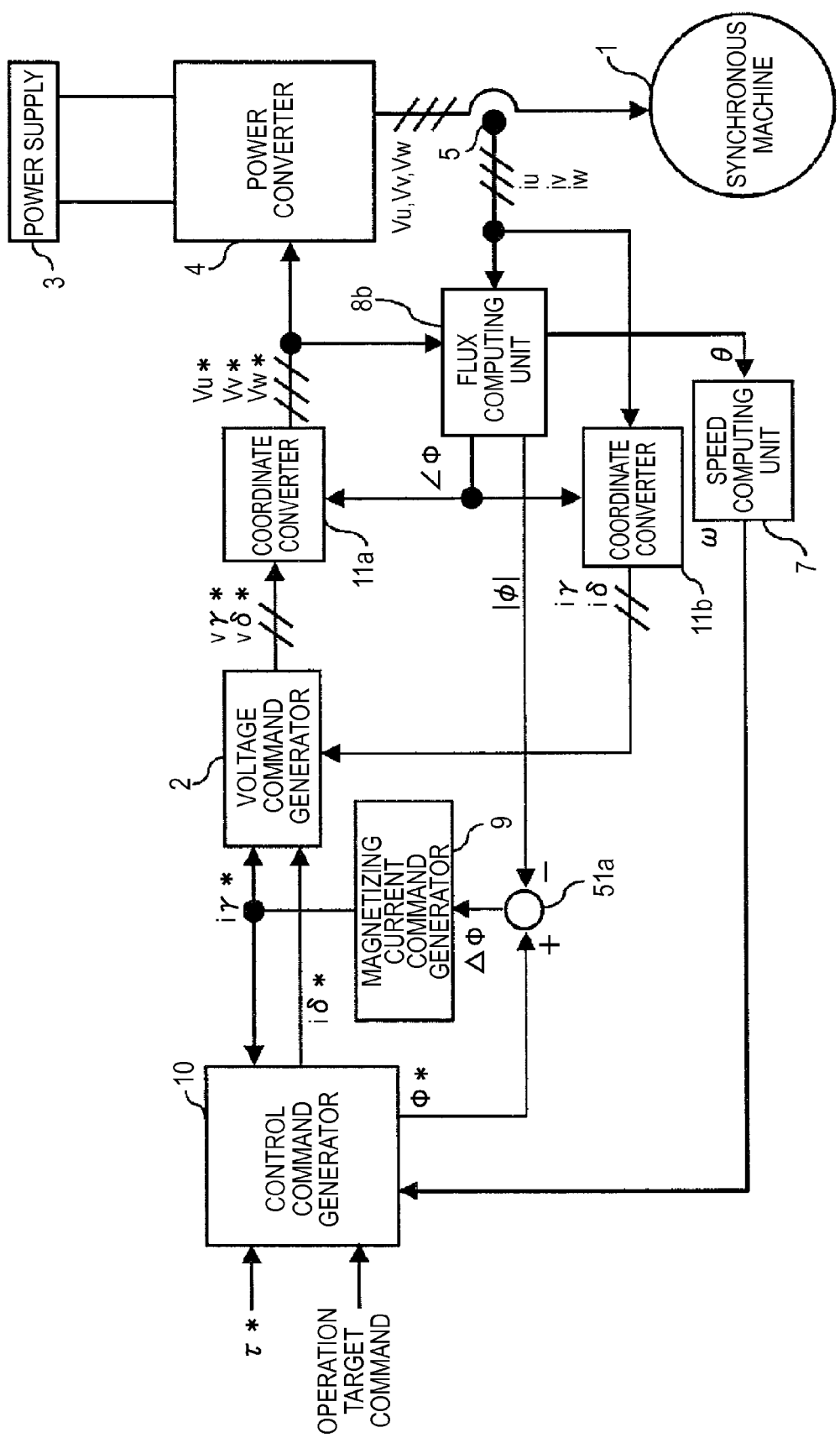
FIG. 4 is a view used to describe the synchronous machine control apparatus according to the first embodiment of the invention and showing another synchronous machine control system including a synchronous machine and a synchronous machine control apparatus.

It is also possible to use a flux computing unit 8b capable of estimating not only the estimated armature interlinkage flux but also the rotor position θ of the synchronous machine 1 as described below. According to this configuration, the flux computing unit 8b includes therein a position detector 6a that estimates the rotor position θ and a known resolver or encoder is not used as the position detector 6. FIG. 4 shows an example of this configuration. More specifically, FIG. 4 shows a synchronous machine control system including the synchronous machine 1 in a case where the position detector 6a is included in the flux computing unit 8b and the synchronous machine control apparatus.

Figure 5:
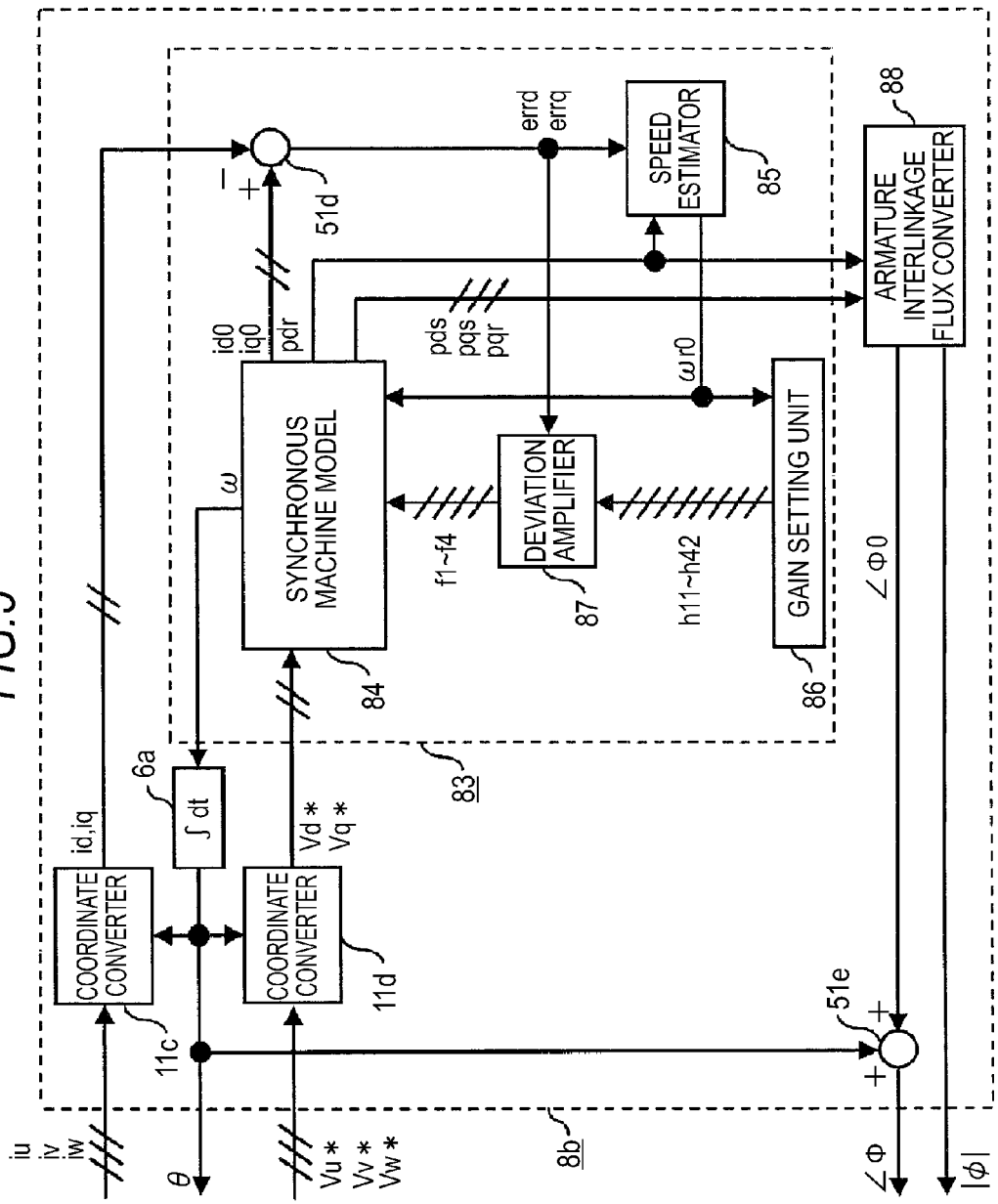
FIG. 5 is a view showing a configuration of a flux computing unit shown in FIG. 4.

FIG. 5 is view showing an example of the configuration of the flux computing unit 8b. The flux computing unit 8b has an adaptation observer 83 that includes therein the position detector 6a instead of the current-fed flux computing unit 81 and the voltage-fed flux computing unit 82.

The flux computing unit 8b is formed of the adaptation observer 83 made up of a synchronous machine model 84, a speed estimator 85, a gain setting unit 86, and a deviation amplifier 87, an armature interlinkage flux converter 88, the position detector 6a, and plural coordinate converters and adding and subtracting units. The adaptation observer 83 is of a configuration same as the configuration disclosed in U.S. Pat. No. 6,825,637(FIG. 1 and FIG. 6 and descriptions thereof) (hereinafter, referred to as Patent Document 4) or WO 2010/109528 (FIG. 5 and FIG. 8 and descriptions thereof) (hereinafter, referred to as Patent Document 5).

Initially, the coordinate converters 11c and 11d convert, respectively, the outputs currents iu, iv, and iw of the synchronous machine 1 to the currents id and iq on the d-q axes on the basis of the rotor position θ by a computation in accordance with Equation (1) above and the voltage commands Vu*, Vv*, and Vw* to the voltage commands Vd* and Vq* on the d-q axes on the basis of the rotor position θ by a computation in accordance with Equation (5) above. Alternatively, it may be configured in such a manner that voltage commands Vγ* and Vδ* on the γ-δ axes outputted from the voltage command generator 2 and described below are directly converted to the voltage commands Vd* and Vq* on the d-q axes.

The synchronous machine model 84 finds a d-axis estimated current id0, a q-axis estimated current iq0, a d-axis component pds of an estimated armature reaction flux, a q-axis component pqs of the estimated armature reaction flux, a q-axis component pqr of an estimated rotor flux, and a rotation speed (electrical angular frequency) ω on the basis of the voltage commands Vd* and Vq* on the d-q axes, an estimated rotation speed ωr0 described below, and deviations f1, f2, f3, and f4. Computation equations in the synchronous machine model 84 are expressed as Equation (8) through Equation (10) below. The components pds, pqs, and pdr are obtained by integrating the both sides of Equation (8) below. A computation expressed as Equation (9) below is equivalent to compute a rotation speed (electrical angular frequency) ω so that the q-axis component pqr of the estimated rotor flux becomes 0. This is the same to bring the direction of an estimated rotor flux vector into agreement with the d axis. Hence, the q-axis component pqr of the estimated rotor flux becomes 0.

$$\frac{d}{dt}\begin{pmatrix} pds \\ pqs \\ pdr \end{pmatrix} = \begin{pmatrix} -\frac{R}{Ld} & \omega & 0 \\ -\omega & -\frac{R}{Lq} & -\omega r0 \\ 0 & 0 & 0 \end{pmatrix}\begin{pmatrix} pds \\ pqs \\ pdr \end{pmatrix} + \begin{pmatrix} Vd^* \\ Vq^* \\ 0 \end{pmatrix} - \begin{pmatrix} f1 \\ f2 \\ f3 \end{pmatrix} \quad (8)$$

$$\omega = \omega r0 - \frac{f4}{pdr0} \quad (9)$$

$$\begin{pmatrix} id0 \\ iq0 \end{pmatrix} = \begin{pmatrix} \frac{1}{Ld} & 0 & 0 \\ 0 & \frac{1}{Lq} & 0 \end{pmatrix}\begin{pmatrix} pds \\ pqs \\ pdr \end{pmatrix} \quad (10)$$

Herein, f1, f2, f3, and f4 are deviations calculated in accordance with Equation (12) described below.

An adding and subtracting unit 51d calculates a d-axis current deviation errd by subtracting the d-axis current id from the d-axis estimated current id0 and a q-axis current deviation errq by subtracting the q-axis current iq from the q-axis estimated current iq0. The speed estimator 85 outputs an estimated rotation speed ωr0 found on the basis of the estimated d-axis rotor flux pdr and the q-axis current deviation errq in accordance with Equation (11) as follows.

$$\omega r0 = \left(Kp0 + \frac{Ki0}{s}\right)\left(\frac{errq}{pdr}\right) \quad (11)$$

Herein, Kp0 is a proportional gain and Ki0 is an integral gain.

The gain setting unit 86 outputs current deviation amplifying gains h11, h12, h21, h22, h31, h32, h41, and h42 found on the basis of the estimated rotation speed ωr0. It is known that suitable values of (a part of) these gains vary with the estimated rotation speed ωr0. Hence, these gains are designed in advance in consideration of a variance of the estimated rotation speed ωr0 so that the components pds, pqs, and pdr can be obtained in a stable manner. The adaptation observer 83 is of a configuration same as the configurations of Patent Documents 4 and 5 and even when the current deviation amplifying gains h11, h12, h21, h22, h31, h32, h41, and h42 are designed according to Patent Documents 4 and 5, this embodiment can be implemented suitably. Hence, a detailed description of the grounds for the design of these gains and a designing method thereof is omitted herein.

The deviation amplifier 87 calculates the deviations f1, f2, f3, and f4 by amplifying the current deviations errd and errq on the d-q axes, respectively, using the current deviation amplifying gains h11, h12, h21, h22, h31, h32, h41, and h42 in accordance with Equation (12) as follows.

$$\begin{pmatrix} f1 \\ f2 \\ f3 \\ f4 \end{pmatrix} = \begin{pmatrix} h11 & h12 \\ h21 & h22 \\ h31 & h32 \\ h41 & h42 \end{pmatrix}\begin{pmatrix} errd \\ errq \end{pmatrix} \quad (12)$$

The position detector 6a is a computing unit equivalent to an integrator and outputs the rotor position θ by integrating rotation speeds (electrical angular frequencies) ω outputted from the synchronous machine model 84.

The adaptation observer 83 is an adaptation observer formed on the d-q axes and computes the rotation speed (electrical angular frequency) ω, the estimated currents id0 and iq0, the estimated rotor fluxes pdr and pqr on the d-q axes, and the estimated rotation speed ωr0 on the basis of the currents id and iq on the d-q axes and the voltage commands Vd* and Vq* on the d-q axes. However, besides the observer formed in this manner, it is also possible to form an adaptation observer on stationary two axes or an adaptation observer that computes variables other than the estimated currents id0 and iq0 as condition variables. Even in such cases, a synchronous machine model 84 having the same functions as those of the model described above can be constructed.

The armature interlinkage flux converter 88 first calculates a d-axis component pd0 and a q-axis component pq0 of the estimated armature interlinkage flux on the basis of the components pds and pqs on the d-q axes of the estimated armature reaction flux and the components pdr and pqr (herein, pqr=0) on the d-q axes of the estimated rotor flux in accordance with Equation (13) as follows.

$$\begin{cases} pd0 = pds + pdr \\ pq0 = pqs + pqr \end{cases} \text{(where } pqr = 0\text{)} \quad (13)$$

The armature interlinkage flux converter 88 calculates an absolute value |Φ| of the estimated armature interlinkage flux and a phase ∠Φ of the estimated armature interlinkage flux in accordance with Equation (3) and Equation (4) above on the basis of the d-axis component pd0 and the q-axis component pq0 of the estimated armature interlinkage flux obtained in accordance with Equation (13) above, and outputs the calculation results.

An operation at the output end of the power converter 4 has been described. Hereinafter, a flow up to generation of the voltage command, that is, an operation at the input end of the power converter 4 will be described sequentially.

In this embodiment, the armature current is controlled on the two axes in a direction (γ axis) of the armature interlinkage flux Φ and a direction (δ axis) orthogonal to the armature interlinkage flux direction as in Patent Document 1 above. Hence, the coordinate converter 11b (see FIG. 1) converts the output currents iu, iv, and iw of the synchronous machine 1 to the currents iγ and iδ on the γ-δ axes on the basis of the phase ∠Φ of the estimated armature interlinkage flux estimated by the flux computing unit 8 (or 8a or 8b) by a computation in accordance with Equation (14) as follows.

$$\begin{pmatrix} i\gamma \\ i\delta \end{pmatrix} = \begin{pmatrix} \cos(\angle\Phi) & \sin(\angle\Phi) \\ -\sin(\angle\Phi) & \cos(\angle\Phi) \end{pmatrix} \begin{pmatrix} \sqrt{\frac{2}{3}} & -\frac{1}{\sqrt{6}} & -\frac{1}{\sqrt{6}} \\ 0 & -\frac{1}{\sqrt{2}} & -\frac{1}{\sqrt{2}} \end{pmatrix} \begin{pmatrix} iu \\ iv \\ iw \end{pmatrix} \quad (14)$$

The γ-axis current iγ and the δ-axis current iδ obtained by this conversion are equivalent to a magnetizing current that operates the armature interlinkage flux of the synchronous machine 1 and a torque current that contributes to generation of a torque by the synchronous machine 1, respectively. In the light of this equivalence, the voltage command generator 2 outputs voltage commands vγ* and vδ* on the γ-δ axes so that the currents iγ and iδ on the γ-δ axes become consistent with desired current commands iγ* and iδ* inputted into the generator 2 from an outside.

Figure 6:
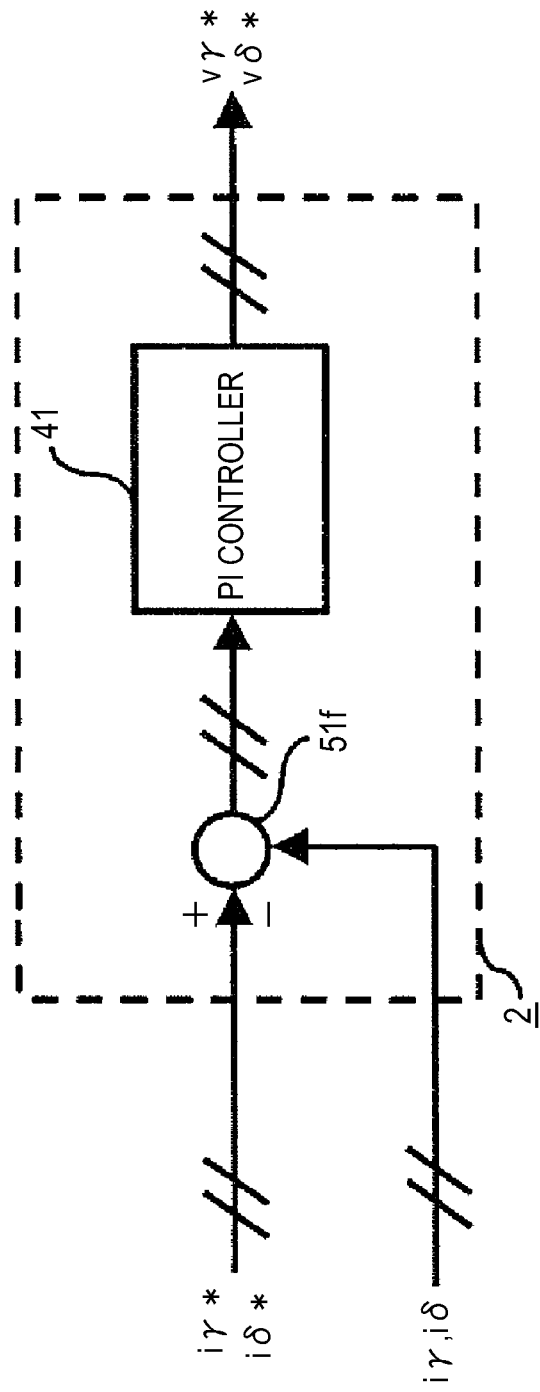
FIG. 6 is a view showing an example of a configuration of a voltage command generator shown in FIG. 1.

FIG. 6 is a view showing an example of the configuration when a current controller is applied to the voltage command generator 2 and it shows a configuration to perform current feedback control. The voltage command generator 2 generates voltage commands (current feedback control commands) vγ* and vδ* on the γ-δ axes by performing proportional and integral control (PI control) in a PI controller 41 in accordance with Equation (15) below on the basis of a deviation between the current commands iγ* and iδ* on the γ-δ axes computed by an adding and subtracting unit 51f and the current iγ and iδ (output currents of the synchronous machine 1) on the γ-δ axes.

$$\begin{cases} v\gamma^* = \left(Kp\gamma + \frac{Ki\gamma}{s}\right)(i\gamma^* - i\gamma) \\ v\delta^* = \left(Kp\delta + \frac{Ki\delta}{s}\right)(i\delta^* - i\delta) \end{cases} \quad (15)$$

Herein, Kpγ is a current control γ-axis proportional gain, kiγ is a current control γ-axis integral gain, Kpδ is a current control δ-axis proportional gain, and kiδ is a current control δ-axis integral gain.

To make output currents of the synchronous machine 1 consistent with desired current commands, it is preferable to perform the current feedback control by applying a current controller to the voltage command generator 2 as above. However, in a case where a ratio of a carrier frequency of the power converter 4 (for example, a known inverter) is small with respect to a rotation speed (electrical angular frequency) ω of the synchronous machine 1 when the synchronous machine 1 is driven at a high speed, as the switching device of the power converter 4 switches less frequently for one cycle of an AC voltage applied to the respective phases of the synchronous machine 1, it becomes difficult to update voltage commands necessary to make the currents of the synchronous machine 1 consistent with desired current commands. Hence, there are quite a few operation conditions under which it becomes difficult to make the output currents of the synchronous machine 1 consistent with desired current commands.

Figure 7:
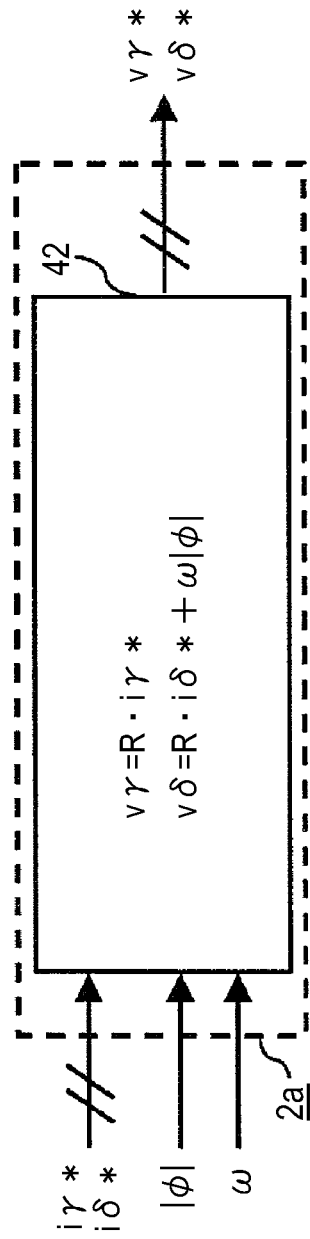
FIG. 7 is a view showing another example of the configuration of the voltage command generator shown in FIG. 1.

FIG. 7 is a view showing an example of the configuration of a voltage command generator 2a. Different from the configuration of FIG. 2, the voltage command generator 2a adopts voltage feed-forward control, so that the operation condition as above can be addressed. It should be noted, however, that it is necessary for this configuration to input the rotation speed (electrical angular frequency) ω of the synchronous machine 1 and an absolute value |Φ| of the estimated armature interlinkage flux into the voltage command generator 2a, neither of which is shown in FIG. 1 as an input to the voltage command generator 2.

A voltage feed-forward command generator 42 generates voltage commands (voltage feed-forward control commands) vγ* and vδ* on the γ-δ axes on the basis of the current commands iγ* and iδ* on the γ-δ axes, the rotation speed (electrical angular frequency) ω of the synchronous machine 1, and an absolute value |Φ| of the estimated armature interlinkage flux in accordance with Equation (16) as follows.

$$\begin{cases} v\gamma^* = R \cdot i\gamma^* \\ v\delta^* = R \cdot i\delta^* + \omega|\Phi| \end{cases} \quad (16)$$

Alternatively, it may be configured in such a manner that a current controller is normally applied to the voltage command generator 2 to perform the current feedback control and the voltage feed-forward control alone is performed by invalidating the current feedback control under an operation condition that makes it difficult to perform the current feedback control.

Figure 8:
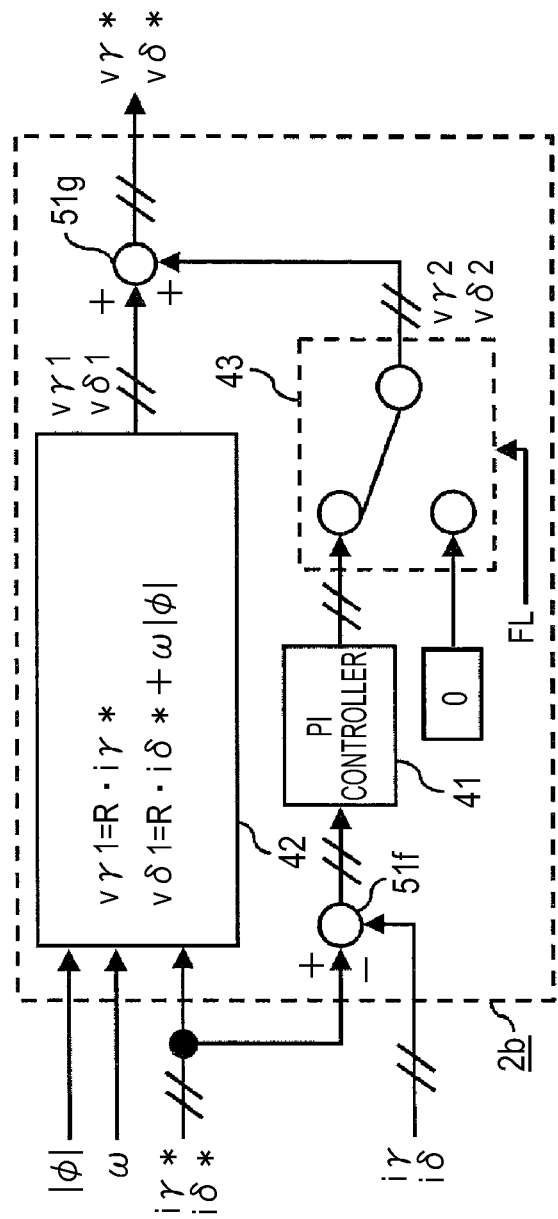
FIG. 8 is a view showing still another example of the configuration of the voltage command generator shown in FIG. 1.

FIG. 8 is an example of the configuration of a voltage command generator 2b. Different from those in FIG. 6 and FIG. 7, the voltage command generator 2b is configured to normally perform the current feedback control and to perform the voltage feed-forward control alone by invalidating the current feedback control under an operation condition that makes it difficult to perform the current feedback control.

As in FIG. 7, the voltage feed-forward command generator 42 generates voltage commands (voltage feed-forward control commands) on the γ-δ axes in accordance with Equation (16) above. It should be appreciated, however, that the voltage commands on the γ-δ axes generated by the voltage feed-forward command generator 42 are denoted as vγ1 and vδ1 as distinguished from the voltage commands (current feedback control commands) on the γ-δ axes generated in the PI controller 41. At the same time, the PI controller 41 generates the voltage commands (voltage feedback control commands) on the γ-δ axes in accordance with Equation (15) above. The voltage commands on the γ-δ axes generated by the PI controller 41 are denoted as vγ2 and vδ2.

Under the operation condition that makes it difficult to perform the current control, the current feedback control expressed as Equation (15) above is invalidated. That is, vγ2=vδ2=0 is given. Then, an adding and subtracting unit 51g generates (final) voltage commands vγ* and vδ* on the γ-δ axes, which are outputs from the voltage command generator 2b, in accordance with Equation 17 as follows.

$$\begin{cases} v\gamma^* = v\gamma 1 + v\gamma 2 \\ v\delta^* = v\delta 1 + v\delta 2 \end{cases} \quad (17)$$

As a method of invalidating the current feedback control in this embodiment, it is configured in such a manner that whether the current feedback control is valid or invalid is set in a current control valid-invalid switching flag FL and a change-over switch 43 makes a switching as to whether an output of the PI controller 41 included in the voltage command generator 2b is valid or invalid according to the flag FL. It should be appreciated, however, that configurations other than the configuration of this embodiment are also available as long as the configuration has a switching function same as the switching function of this configuration. As is shown in FIG. 8, when an output of the PI controller 41 is invalidated, the change-over switch 43 is switched so that $v\gamma 2 = v\delta 2 = 0$ is given.

A suitable criterion according to which the change-over switch 43 is switched, that is, whether the current feedback control is valid or invalid is determined is, in the first place, the rotation speed ω of the synchronous machine 1. More specifically, as the rotation speed ω of the synchronous machine 1 increases, frequencies of the voltages Vu, Vv, and Vw applied to the synchronous machine 1 by the power converter 4 increase, too. Hence, in order to perform satisfactory current feedback control by making the currents of the synchronous machine 1 consistent with the desired current commands, it is necessary to perform the current control delicately by increasing a carrier frequency of the power converter 4 and allowing the switching device of the power converter 4 to switch more frequently. It should be noted, however, that the upper limit of the carrier frequency of the power converter 4 depends on the characteristics of the switching device of the power converter 4. There is a method that takes the foregoing into consideration. That is, a speed range within which the current feedback control is performed in a stable manner is preliminarily found within a carrier frequency range that is set in consideration of the characteristics of the switching device. Then, it is determined to invalidate the current feedback control in a case where the rotation speed ω of the synchronous machine 1 exceeds this speed range.

Another suitable criterion is a ratio of the carrier frequency of the power converter 4 with respect to the rotation speed ω of the synchronous machine 1. Even under the condition that the rotation speed is the same, the number of switching times of the switching device of the power converter 4 for one cycle of an AC voltage applied to the respective phases of the synchronous machine 1 varies with the setting of the carrier frequency of the power converter 4. Accordingly, stability of the current feedback control varies, too. Hence, in a case where the setting of the carrier frequency of the power converter 4 changes constantly, it is more preferable to determine whether the current feedback control is valid or invalid according not only to the rotation speed ω of the synchronous machine 1 alone, but also to a ratio of the carrier frequency of the power converter 4 with respect to the rotation speed ω of the synchronous machine 1. When configured in this manner, it also becomes possible to appropriately change a rotation speed at which a switching is made to make the current feedback control valid or invalid according to the setting of the carrier frequency.

The voltage commands $v\gamma^*$ and $v\delta^*$ on the γ-δ axes outputted from the voltage command generator 2 (or 2a or 2b) are converted to the voltage commands Vu*, Vv*, and Vw* in the coordinate converter 11a on the basis of the phase ∠θ of the estimated armature interlinkage flux estimated by the flux computing unit 8 (or 8a or 8b) by a computation in accordance with Equation (18) below and then outputted to the power converter 4.

$$\begin{pmatrix} Vu^* \\ Vv^* \\ Vw^* \end{pmatrix} = \begin{pmatrix} \sqrt{\frac{2}{3}} & 0 \\ -\frac{1}{\sqrt{6}} & \frac{1}{\sqrt{2}} \\ -\frac{1}{\sqrt{6}} & -\frac{1}{\sqrt{2}} \end{pmatrix} \begin{pmatrix} \cos(\angle \Phi) & -\sin(\angle \Phi) \\ \sin(\angle \Phi) & \cos(\angle \Phi) \end{pmatrix} \begin{pmatrix} V\gamma^* \\ V\delta^* \end{pmatrix} \quad (18)$$

There is, however, a control computation lag time (wasted time) until the control computation on the basis of the values of the output currents iu, iv, and iw of the synchronous machine 1 detected by the current detector 5 are reflected on the three-phase voltages Vu, Vv, and Vw outputted from the power converter 4. Hence, the coordinate converter 11a may take this control computation lag time into consideration by performing the coordinate conversion using a phase corrected by adding an amount of phase correction, θd2, found on the basis of the control computation lag time to the rotor position θ in Equation (18) above. The power converter 4 applies the voltages Vu, Vv, and Vw to the synchronous machine 1 according to the voltage commands Vu*, Vv*, and Vw* as described above.

A magnetizing current command generator 9 generates a magnetizing current command iγ* on the basis of a (armature interlinkage) flux error ΔΦ so that the flux error ΔΦ is reduced to 0. The flux error ΔΦ is a value calculated in an adding and subtracting unit 51a by subtracting an absolute value |Φ| of the estimated armature interlinkage flux from an armature interlinkage flux command Φ* generated by the control command generator 10 described below and a computation equation is expressed as Equation (19) as follows.

$$\Delta \Phi = \Phi^* - |\Phi| \quad (19)$$

Because the γ-axis current iγ is a magnetizing current, which is a magnetizing component of the synchronous machine 1, it is possible to operate the armature interlinkage flux by the γ-axis current. More specifically, given the γ-axis direction inductance Lγ as a proportional coefficient, then a relation between increased and decreased amounts of the magnetizing current and increased and decreased amounts of the armature interlinkage flux is proportional. It is therefore suitable to use an integrator having no direct term as a controller that adjusts the flux error ΔΦ to be reduced to 0. Hence, the magnetizing current command iγ* is generated by an integral control computation expressed as Equation (20) as follows.

$$i\gamma^* = \frac{Kf \cdot \Delta \Phi}{s} \quad (20)$$

where Kf is an integral gain.

The control command generator 10, which is a characteristic portion of this embodiment, will now be described. FIG. 9 is a view showing an example of the configuration of the control command generator 10. The control command generator 10 is formed of a torque current command generator 25, a torque current command limiter 26, a first flux command generator 21, a second flux command generator 22, a command allocation setting unit 23, and a flux command adjustor 24. The torque current command generator 25 calculates a torque current command $i\delta^*$ on the basis of a torque command $\tau^*$ provided from an outside of the synchronous machine control apparatus and an armature interlinkage flux command $\Phi^*$ outputted from the flux command adjuster 24 described below in accordance with Equation (21) as follows.

$$i\delta^* = \frac{\tau^*}{Pm \cdot \Phi^*} \quad (21)$$

where Pm is the number of pole pairs in the synchronous machine 1.

Assume that the (armature interlinkage) flux error $\Delta\Phi$ is adjusted to be 0 in the magnetizing current command generator 9 (see FIG. 1). Then, an absolute value $|\Phi|$ of the estimated armature interlinkage flux obtained from the flux computing unit 8 (8a or 8b) may be used instead of the armature interlinkage flux command $\Phi^*$ in a computation in accordance with Equation (21) as follows.

$$i\delta^* = \frac{\tau^*}{Pm \cdot |\Phi|} \quad (22)$$

The torque current command limiter 26 limits a combined current of the torque current command $i\delta^*$ and the magnetizing current command $i\gamma^*$ to a current limit value imax determined according to the specification of the power converter 4. To this end, the torque current command limiter 26 limits the torque current command $i\delta^*$ according to the current limit value imax and the magnetizing current command $i\gamma^*$. An upper limit value $i\delta^*$max of the torque current command $i\delta^*$ is obtained in accordance with Equation (23) below and the torque current command limiter 26 limits the torque current command $i\delta^*$ so that an absolute value $|i\delta^*|$ of the torque current command $i\delta^*$ is equal to or less than the upper limit value $i\delta^*$max while finding the upper limit value $i\delta^*$max constantly.

$$i\delta^*\text{max} = \sqrt{(i\text{max})^2 - (i\gamma^*)^2} \quad (23)$$

The first flux command generator 21 outputs a first flux command $\Phi_1^*$ suitable for the torque current command $i\delta^*$ inputted therein. The flux command generator 21 outputs the first flux command $\Phi_1^*$ instructing to output a maximum torque under a condition that an absolute value $|i|$ of the current vector i in the armature winding of the synchronous machine 1 is constant. By driving the synchronous machine 1 under this condition, a copper loss occurring in an armature winding of the synchronous machine 1 or a wire between the synchronous machine 1 and the power converter 4 becomes smaller. Also, a conduction loss occurring in the power converter 4 becomes smaller, too. It thus becomes possible to improve conversion efficiency of the synchronous machine 1 and the power converter 4.

A relation among an absolute value $|i|$ of the current vector i, the currents id and iq on the d-q axes, and the current $i\gamma$ and $i\delta$ on the $\gamma$-$\delta$ axes is expressed as Equation (24) as follows.

$$|i| = \sqrt{id^2 + iq^2} = \sqrt{i\gamma^2 + i\delta^2} \quad (24)$$

Figure 10A:
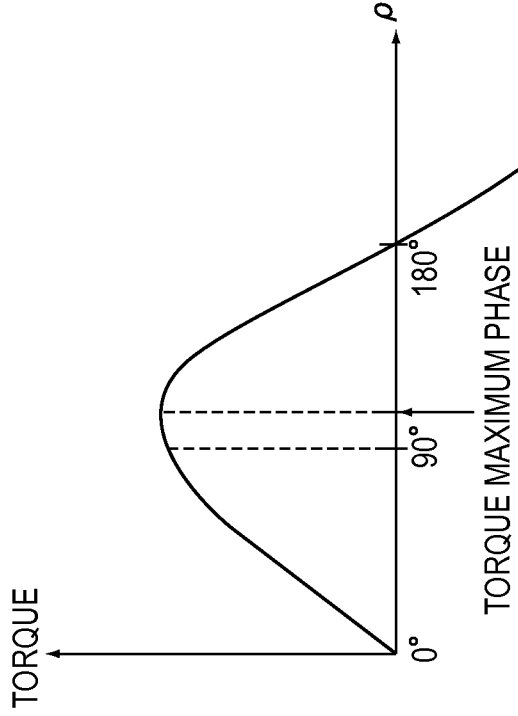
FIG. 10A and FIG. 10B are views used to describe a definition of a phase and a relation between a phase and a torque.
Figure 10B:
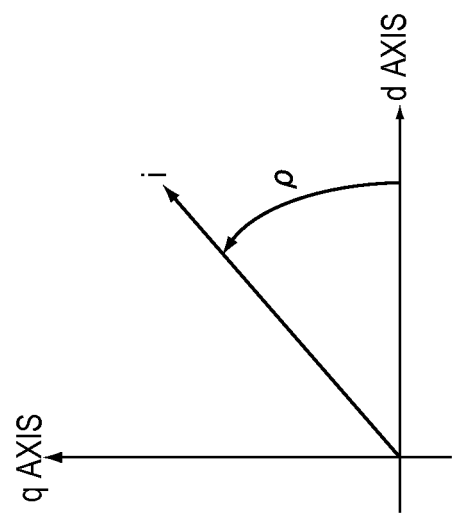

A relation between the torque current command $i\delta^*$ and the first flux command $\Phi_1^*$ satisfying the condition specified above will now be discussed. In a permanent magnet synchronous machine having a permanent magnet, a synchronous machine that generates a torque by utilizing magnetic saliency of the rotor, such as a reluctance motor, and a field-wound synchronous machine having a field winding inducing a constant field flux, as are shown in FIG. 10A, when a phase $\rho$ of a current vector having a constant absolute value from the d axis is changed, as is shown in FIG. 10B, it can be found that there is a phase in which the torque reaches a maximum value.

Herein, a motor of an inverse saliency (Lq>Ld) in which the q-axis inductance is larger than the d-axis inductance like a permanent magnet synchronous machine will be described as an example. As is shown in FIG. 10B, a torque reaches a maximum value when the phase $\rho$ of the current vector i is at a given angle larger than 90°. In the absence of magnetic saturation of the iron core, this suitable current phase $\rho$ is constant independently of the magnitude of the armature current. In an actual machine, however, because inductance varies due to magnetic saturation, the suitable current phase $\rho$ varies with the magnitude of the armature current due to a reluctance torque. Magnetic saturation does not occur while the armature current is small. Hence, a torque becomes larger by setting the phase $\rho$ at an angle larger than 90° (for example, about 110°) under a condition that an absolute value $|i|$ of the current vector i is constant.

Figure 11:
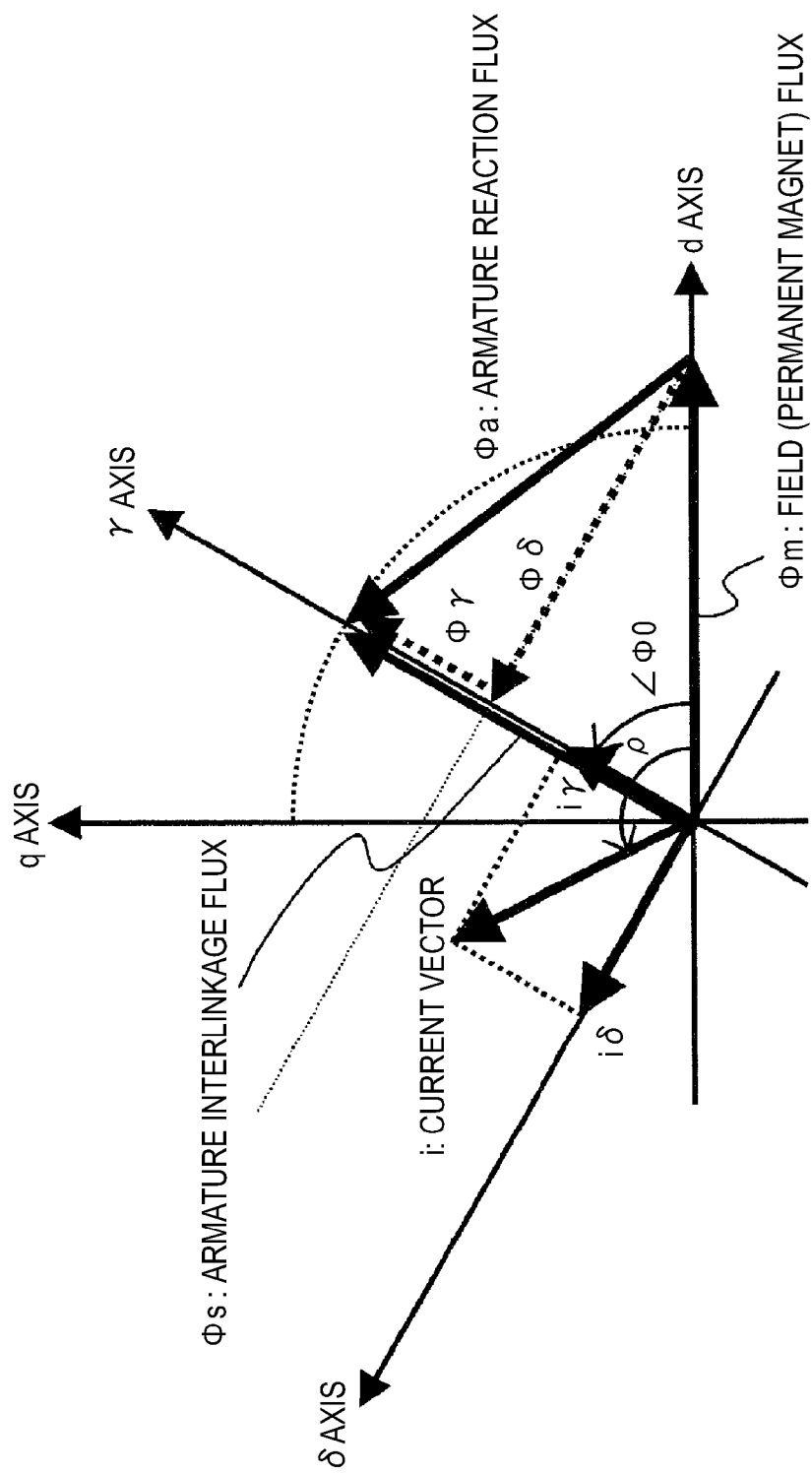
FIG. 11 is a vector chart of a synchronous machine (chiefly a permanent magnet synchronous machine)

When the condition of an absolute value of the current vector is changed by increasing the armature current, magnetic saturation occurs in the q-axis direction in which the current chiefly flows. Eventually, a difference between the q-axis inductance Lq and the d-axis inductance Ld becomes small. Hence, there is a case where a torque becomes larger by setting the phase $\rho$ at a smaller angle (for example, about 100°). Herein, a relation between the armature current and the flux in this suitable current phase state will be discussed. As is shown in a vector chart of the synchronous machine (chiefly a permanent magnet synchronous machine) of FIG. 11, an armature interlinkage flux $\Phi s$ (denoted as $\Phi s$ as distinguished from the estimated armature interlinkage flux $\Phi$ described above) is shown as a combination of an armature reaction flux $\Phi a$ induced by the current vector i and a field (permanent magnet) flux $\Phi m$. Because a direction orthogonal to the armature interlinkage flux $\Phi s$ is the $\delta$ axis, the $\delta$-axis direction component of the current vector i is a $\delta$-axis current $i\delta$. Hence, once an absolute value of the armature current and the current vector i made of the suitable current phase $\rho$ determined by the absolute value are determined, the $\delta$-axis current $i\delta$ and an absolute value of the armature interlinkage flux $\Phi s$ can be determined uniquely. It is therefore understood that, under the condition allowing a torque to reach a maximum value, there is a relation of one-to-one correspondence between the $\delta$-axis current $i\delta$ and an absolute value $|\Phi s|$ of the armature interlinkage flux. It should be noted that no consideration is given to a voltage limit value limited by specifications of the power converter 4 when an absolute value $|\Phi s|$ of the armature interlinkage flux is determined as described thus far.

Referring to FIG. 9 again, the first flux command generator 21 finds a relation between the $\delta$-axis current $i\delta$ and an absolute value $|\Phi s|$ of the armature interlinkage flux on the basis of the idea described above. The first flux command generator 21 then pre-stores the relation thus found in the form of an equation using $\Phi_1^*$ as a function of $i\delta^*$ as expressed as Equation (25) below or in the form of table data. Thereafter, the first flux command generator 21 outputs a first flux command $\Phi_1^*$, which is a suitable absolute value of the armature interlinkage flux according to the toque current command $i\delta^*$ inputted therein.

$$\Phi_1^* = f(i\delta^*) \quad (25)$$

The second flux command generator 22 outputs a second flux command $\Phi_2^*$ suitable for the torque current command iδ* and the rotation speed (electrical angular frequency) ω of the synchronous machine 1 inputted therein. The flux command generator 22 outputs the second flux command Φ2* directing to decrease a speed-dependent iron loss including an overcurrent loss and a hysteresis loss in the synchronous machine 1 for the torque current command iδ* inputted therein.

By driving the synchronous machine 1 under this condition, an iron loss that occurs noticeably in the synchronous machine 1 particularly at a high rotation speed becomes smaller. It thus becomes possible to improve conversion efficiency of the synchronous machine 1 chiefly in a high rotation speed region.

Regarding an example of a method of finding the second flux command Φ2* suitable for the torque current command iδ* and the rotation speed (electrical angular frequency) ω of the synchronous machine 1, the current phase ρ is shifted back and forth while the rotation speed ω is fixed to a given speed ω1 and the current vector i is fixed to a given value i1 (the d-axis current id may be increased and decreased while the q-axis current iq is fixed), and a variance of an iron loss with the current phase ρ is found.

An iron loss may be preliminarily found by using a known field analysis tool or actual measurement, that is, an iron loss can be found in any manner. When configured in this manner, a current phase ρ in which an iron loss decreases to a minimum level at a given speed ω=ω1 and a given current vector i=i1 can be found. Hence, the currents id and iq on the d-q axes can be found from the relation between the current vector i and the current phase ρ. Consequently, a set of the currents id and iq on the d-q axes, id1 and iq1, with which an iron loss decreases to a minimum level at a given speed ω1 and a given current vector i1, can be found. Once a set of fluxes Φd and Φq on the d-q axes, Φd1 and Φq1, for the set of id and iq on the d-q axes, id1 and iq1, is found, an absolute value of the armature interlinkage flux, |Φs|=|Φs1|, and the δ-axis current iδ=iδ1 under this condition can be found from relations expressed as Equations (26) through (28) below. It thus becomes possible to find a relation between the δ-axis current iδ and the absolute value |Φs| of the armature interlinkage flux with which an iron loss decreases to a minimum level.

$$|\Phi s1| = \sqrt{\Phi d1^2 + \Phi q1^2} \quad (26)$$

$$\angle \Phi 01 = \tan^{-1}\left(\frac{\Phi q1}{\Phi d1}\right) \quad (27)$$

$$i\delta 1 = -id1 \cdot \sin(\angle \Phi 01) + iq1 \cdot \cos(\angle \Phi 01) \quad (28)$$

The absolute value |Φs1| found in this instance is the second flux command Φ2*(=Φ21*=|Φs1|) suitable for the torque current (command iδ1*) and the rotation speed ω1 of the synchronous machine 1 inputted into the second flux command generator 22.

As an example of the method of finding the set of the fluxes Φd and Φq on the d-q axes, Φd1 and Φq1, for the set of the currents id and iq on the d-q axes, id1 and iq1, as is described above, the set may be preliminarily found using a known field analysis tool or actual measurement by finding the fluxes Φd and Φq on the d-q axes from the relation expressed as Equation (7) above when voltages are known. By performing this work for plural current vectors (i=i2, i3, . . . , and so on) and rotation speeds (ω=ω2, ω3, . . . , and so on), it becomes possible to obtain a relation of the second flux commands (Φ2* Φ22, Φ23, . . . , and so on) suitable for the torque current commands iδ* (iδ*=iδ2*, iδ3, . . . , and so on) and the rotation speed (electrical angular frequency) ω* of the synchronous machine 1 inputted into the second flux command generator 22.

Figure 12:
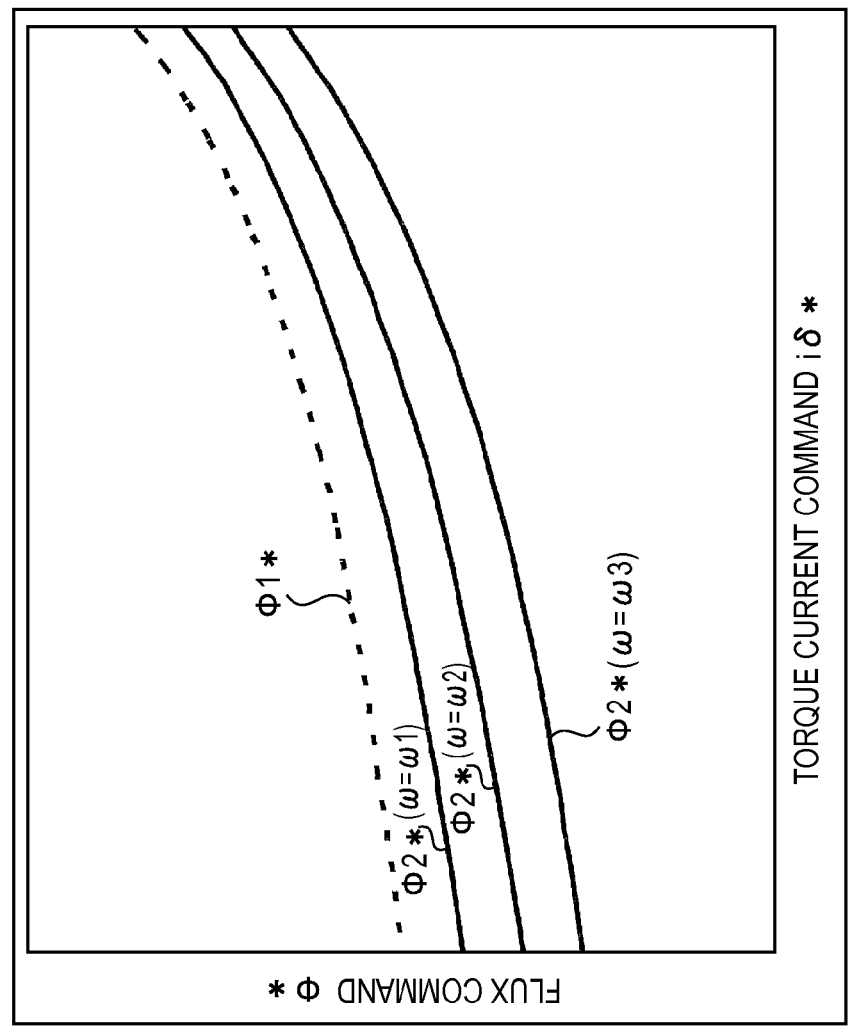
FIG. 12 is a view used to describe a relation between a torque current command and a flux command.

FIG. 12 is a view showing examples of a relation (dotted line) of the first flux command Φ1* with respect to the torque current command iδ* and relations (three solid curves) of the second flux command Φ2* with respect to the torque current command iδ* and plural rotation speeds ω1, ω2, and ω3 (ω1<ω2<ω3) of the synchronous machine 1. It should be noted, however, that no consideration is given to the voltage limit value limited by specifications of the power converter 4 in FIG. 12.

In order to obtain the second flux command Φ2* for the torque current command iδ* and the rotation speed (electrical angular frequency) ω of the synchronous machine 1, the relations of FIG. 12 may be provided in the form of a table or a map or as an equation using Φ2* as a function of iδ* and ω as expressed as Equation (29) as follows.

$$\Phi 2^* = f(i\delta^*, \omega) \quad (29)$$

It is known that when the armature interlinkage flux is decreased, an iron loss generally tends to decrease. Hence, in a case where the synchronous machine 1 is driven according to the second flux command Φ2* obtained by the second flux command generator 22 alone, there is a need for a current that weakens the armature interlinkage flux (this need is particularly strong when the synchronous machine 1 is a permanent magnet synchronous machine). Accordingly, in comparison with a case where the synchronous machine 1 is driven according to the first flux command Φ1* obtained by the first flux command generator 21 alone, the value of a current necessary to generate the same torque increases. On the contrary, the value of the armature interlinkage flux necessary to generate the same torque decreases in comparison with a case where the synchronous machine 1 is driven according to the first flux command Φ1* alone.

The example above has described the second flux command generator 22 configured to output the second flux command Φ2* instructing to decrease a speed-dependent iron loss including an overcurrent loss and a hysteresis loss in the synchronous machine 1 for the torque current command iδ* inputted therein. The second flux command generator 22, however, may be configured so as to output a second flux command Φ2* for the torque current command iδ* instructing to minimize a total loss of an iron loss and a copper loss occurring in the armature winding of the synchronous machine 1 and a wire between the synchronous machine 1 and the power converter 4, and further all the losses occurring in the synchronous machine 1 including a mechanical loss, such as a windage loss. When configured in this manner, all the losses occurring in the synchronous machine 1 can be taken into consideration and it becomes possible to further improve the conversion efficiency of the synchronous machine 1.

The flux command adjustor 24 constantly outputs an armature interlinkage flux command Φ* by assigning weights to the first flux command Φ1* and the second flux command Φ2* online in accordance with Equation (30) below according to an allocation coefficient K set by the command allocation setting unit 23 described below.

$$\Phi^* = \Phi 1^* \cdot (1-K) + \Phi 2^* \cdot K \quad (30)$$

In other words, this means that as the allocation coefficient K approaches K=1, a higher priority is placed on the operation to minimize a loss including an iron loss (maximize conversion efficiency) of the synchronous machine 1 and as the allocation coefficient K approaches K=0, a higher priority is placed on the operation to minimize a current.

The command allocation setting unit 23 sets the allocation coefficient K equivalent to an allocation ratio of the two flux commands, the first flux command Φ1* and the second flux command Φ2*, according to an operation target command provided from an outside of the synchronous machine control apparatus.

The term, "the operation target", referred to herein means a command indicating at which target an operation is aimed when the synchronous machine 1 is driven, for example, whether an operation is aimed at achieving maximum efficiency or minimum heat generation of the synchronous machine 1 or the power converter 4. When the synchronous machine 1 is driven, for example, in a case where the power converter 4 has a more than enough heat capacity whereas the synchronous machine 1 has a less than enough heat capacity, it is necessary to perform an operation so that heat generation in the synchronous machine 1 is reduced to a minimum level, that is, conversion efficiency of the synchronous machine 1 is always at a maximum level. Accordingly, the synchronous machine 1 is driven according to the second flux command Φ2*. In this case, K=1 is set always. Conversely, in a case where the power converter 4 has a less than enough heat capacity whereas the synchronous machine 1 has a more than enough heat capacity, it is necessary to minimize heat generation in the power converter 4, that is, to make a current outputted from the power converter 4 to the synchronous machine 1, that is, an armature current of the synchronous machine 1, as small as possible. Accordingly, the synchronous machine 1 is driven according to the first flux command Φ1*. In this case, K=0 is set always.

In a case where there is no bias in heat capacity between the synchronous machine 1 and the power converter 4, an operation target is to place a higher priority to conversion efficiency of the synchronous machine 1. Hence, K=1 is set and the synchronous machine 1 is driven according to the second flux command Φ2*. Alternatively, in a case where the conversion efficiency of the power converter 4 is known, an operation target may be to place a higher priority to total conversion efficiency of the synchronous machine 1 and the power converter 4. Hence, the synchronous machine 1 is driven while the value of K is adjusted constantly by also taking conversion efficiency of the power converter 4 into consideration. Further, an operation target may be to place a priority to optimization of a temperature change in the synchronous machine 1 or the power converter 4. Hence, the synchronous machine 1 is driven while adjusting the value of K constantly in response to a temperature condition by monitoring each of the synchronous machine 1 and the power converter 4. In this manner, weights can be assigned to the first flux command Φ1* and the second flux command Φ2* by setting an operation target to suit the situation.

The above has described the control command generator 10. It should be appreciated, however, that in a case where the torque current command iδ* is limited according to the current limit value imax and the magnetizing current command iγ* as expressed as Equation (23) above, calculations are made cyclically from the torque current command generator 25 to the flux command adjustor 24. In other words, there is a loop starting from a torque command τ*→(torque current command generator 25, torque current command limiter 26)→torque current command iδ*→(first flux command generator 21, second flux command generator 22, flux command adjuster 24)→armature interlinkage flux command Φ*→ (torque current command generator 25)→torque current command iδ*, . . . , and so on. Hence, in order to finalize the torque current command iδ* and the armature interlinkage flux command Φ* for the torque command τ* inputted into the control command generator 10, it becomes necessary to converge these commands by repeating computations between the torque current command generator 25 and the flux command adjuster 24. A computing process therefore becomes difficult.

There are countermeasures against this inconvenience as follows. That is, when the process described above is performed in an actual apparatus using a microcomputer in a predetermined computation cycle, for example, a result of the last computation (one computation cycle earlier) may be used as the armature interlinkage flux command Φ* to be used by the torque current command generator 25. The torque current command generator 25 thus calculates the torque current command iδ* using this command value. Then, the flux command adjuster 24 calculates the armature interlinkage flux command Φ* of this time according to the torque current command iδ* thus calculated. Alternatively, the flux command adjuster 24 may output the value of the armature interlinkage flux command Φ* after applying appropriate filtering. Either countermeasure can increase the stability of the computing process and is applicable to an actual apparatus. Also, in FIG. 1, a control command generator 10a described below may be used instead of the control command generator 10.

Figure 13:
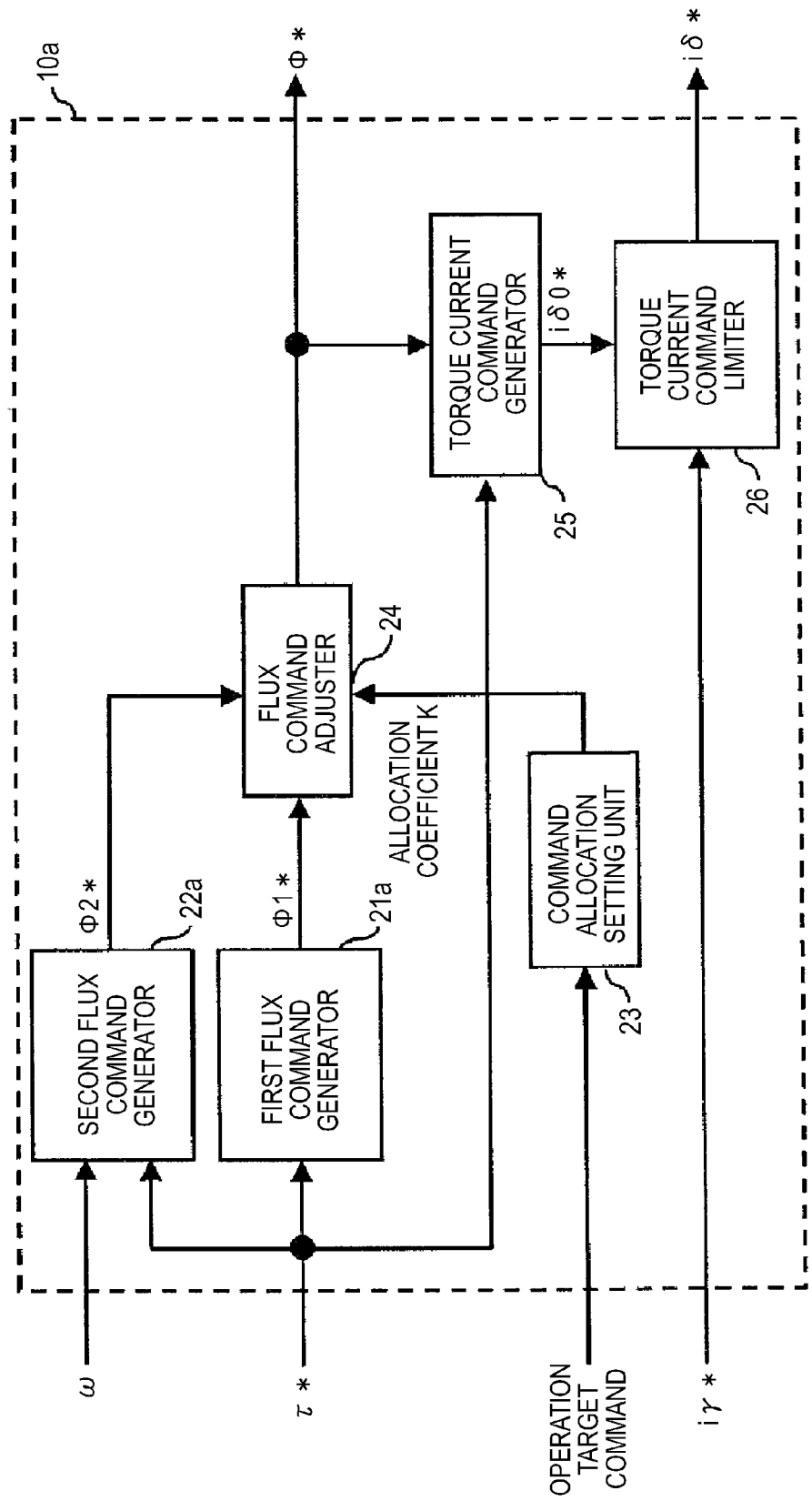
FIG. 13 is a view showing another example of the configuration of the control command generator shown in FIG. 1.

FIG. 13 is a view showing an example of the configuration of the control command generator 10a. The control command generator 10a is configured in such a manner that the first flux command Φ1* and the second flux command Φ2* are generated according to the torque command τ* instead of the torque current command iδ*.

A first flux command generator 21a outputs a first flux command Φ1* suitable for the torque command τ* inputted therein. Likewise, a second flux command generator 22a outputs a second flux command Φ2* suitable for the torque command τ* inputted therein. By converting the abscissa of FIG. 12 to a torque command using a relation expressed as Equation (31) below, it becomes possible to obtain the first flux command Φ1* and the second flux command Φ2* for the torque command τ* and the rotation speed ω of the synchronous machine 1 inputted into the first and second flux command generators 21a and 22a.

$$\tau^* = Pm \cdot \Phi^* \cdot i\delta^* \quad (31)$$

Figure 14:
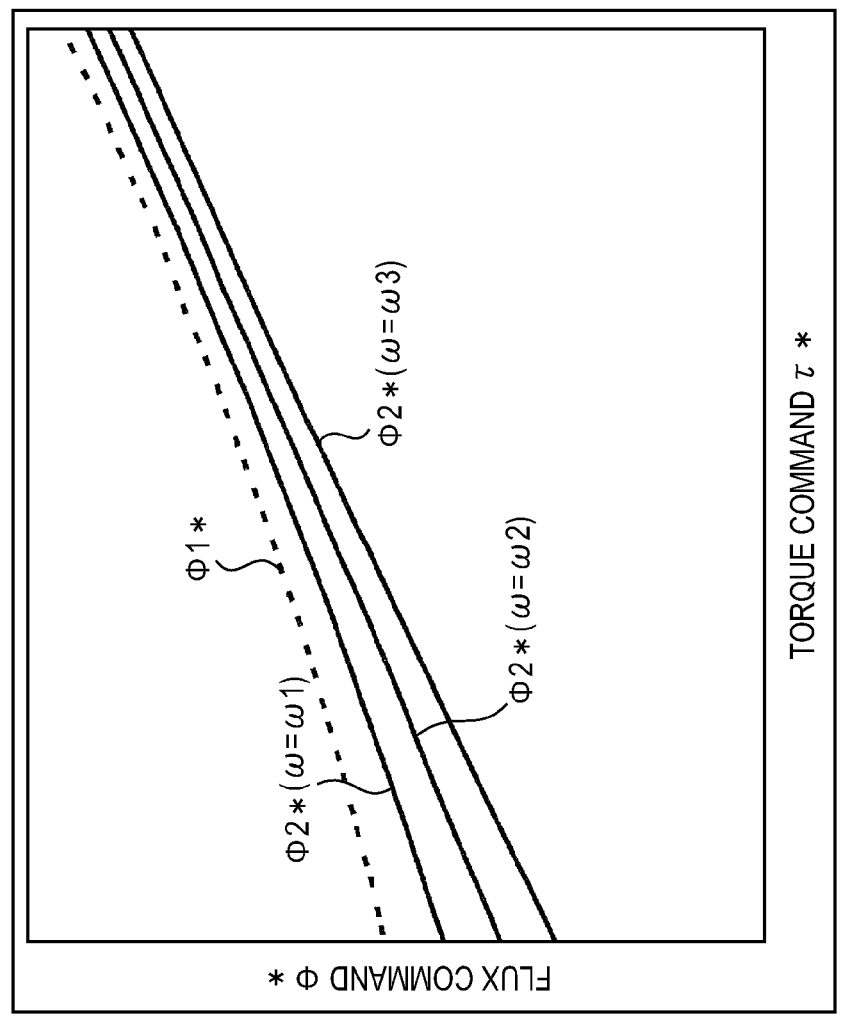
FIG. 14 is a view used to describe a relation between a torque command and a flux command.

FIG. 14 is a view showing examples of a relation (dotted line) of the first flux command Φ1* with respect to the torque command τ* obtained by the conversion in accordance with Equation (31) above and relations (three solid curves) of the second flux command Φ2* with respect to the torque command τ* and plural rotation speeds ω1, ω2, and ω3 (ω1<ω2<ω3) of the synchronous machine 1. It should be noted that no consideration is given to the voltage limit value limited by specifications of the power converter 4 in FIG. 14.

As with the first flux command generator 21 and the second flux command generator 22 described above, in a case where the first flux command generator 21a and the second flux command generator 22a in the control command generator 10a obtain the first flux command Φ1* and the second flux command Φ2*, respectively, for the torque command τ* and the rotation speed ω of the synchronous machine 1, the relations of FIG. 14 can be provided in the form of a table or a map or equations using Φ1* as a function of τ* and using Φ2* as a function of τ* and was expressed by Equation (32) and Equation (33), respectively, as follows.

$$\Phi 1^* = f(\tau^*) \quad (32)$$

$$\Phi 2^* = f(\tau^*, \omega) \quad (33)$$

Operations of the command allocation setting unit 23, the flux command adjuster 24, the torque current command generator 25, and the torque current command limiter 26 in the control command generator 10a are the same as those of the respective counterparts in the control command generator 10.

The above has described the synchronous machine control apparatus of the first embodiment. According to this embodiment, by giving consideration to the fact that a suitable operation target (maximum efficiency or minimum heat generation in the synchronous machine or the power converter) varies with conditions (chiefly temperatures) of the synchronous machine 1 and the power converter 4 even under the condition that the torque command is the same, an operation target command suitable for conditions (chiefly, temperatures) of the synchronous machine 1 and the power converter 4 is generated first and thence a control command (armature interlinkage flux command) satisfying an operation target is generated constantly online in consideration of the conversion efficiency of the synchronous machine 1. Hence, there can be achieved an advantage that the synchronous machine 1 can be driven while controlling a loss and heat generation in the synchronous machine 1 or the power converter 4 effectively at high efficiency.

Second Embodiment

Figure 15:
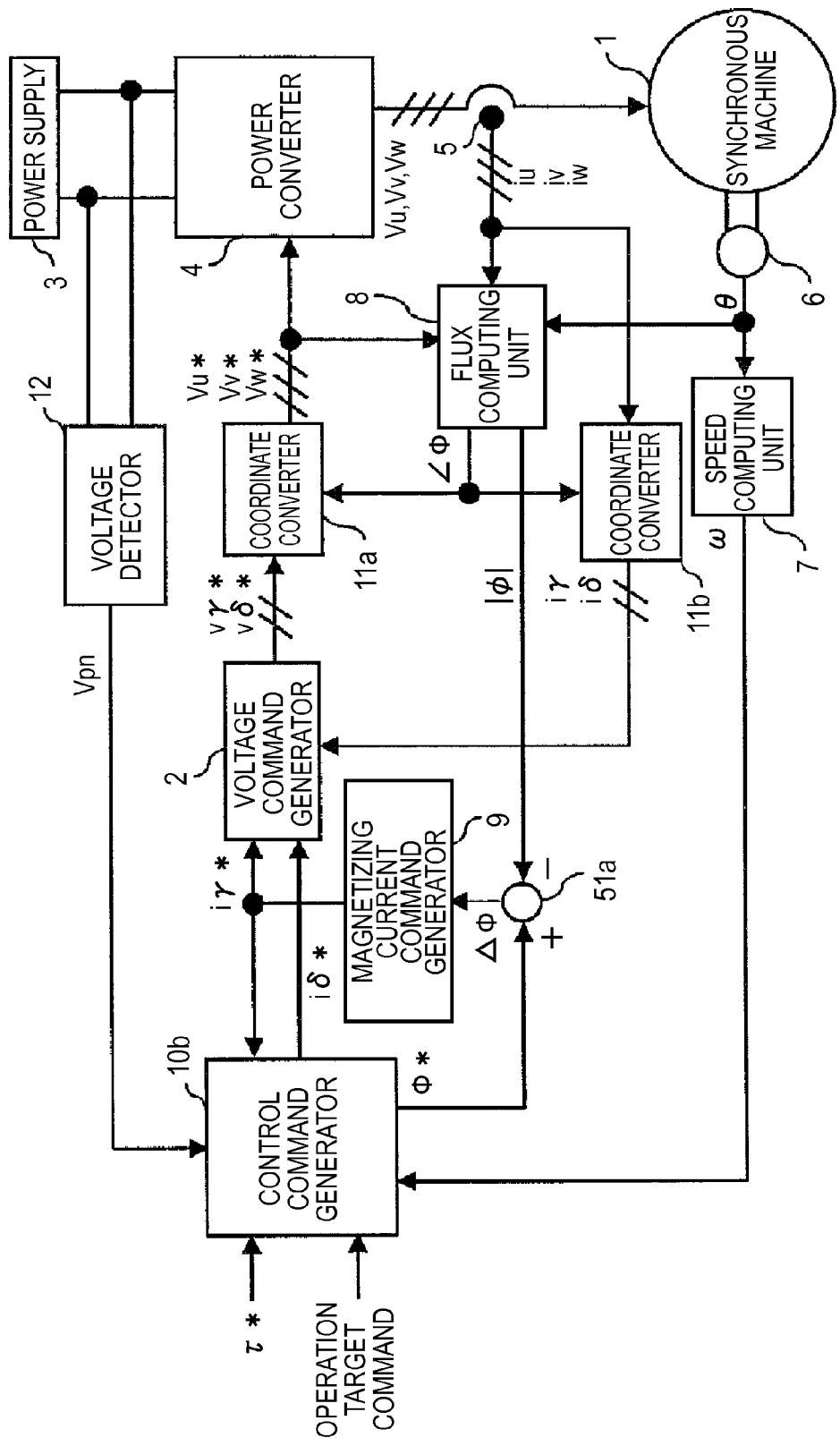
FIG. 15 is a view used to describe a synchronous machine control apparatus according to a second embodiment of the invention and showing a synchronous machine control system including a synchronous machine and a synchronous machine control apparatus.

A synchronous machine control apparatus according to a second embodiment of the invention will now be described in accordance with FIG. 15. FIG. 15 is a view used to describe the synchronous machine control apparatus of the second embodiment and it shows a synchronous machine control system including a synchronous machine and a synchronous machine control apparatus.

The synchronous machine control apparatus of the second embodiment is provided with a voltage detector that detects a power supply voltage across the power supply and the control command generator additionally includes a flux command limiter that imposes a limitation on an armature interlinkage flux command on the basis of a rotation speed of the synchronous machine and the power supply voltage.

Figure 16:
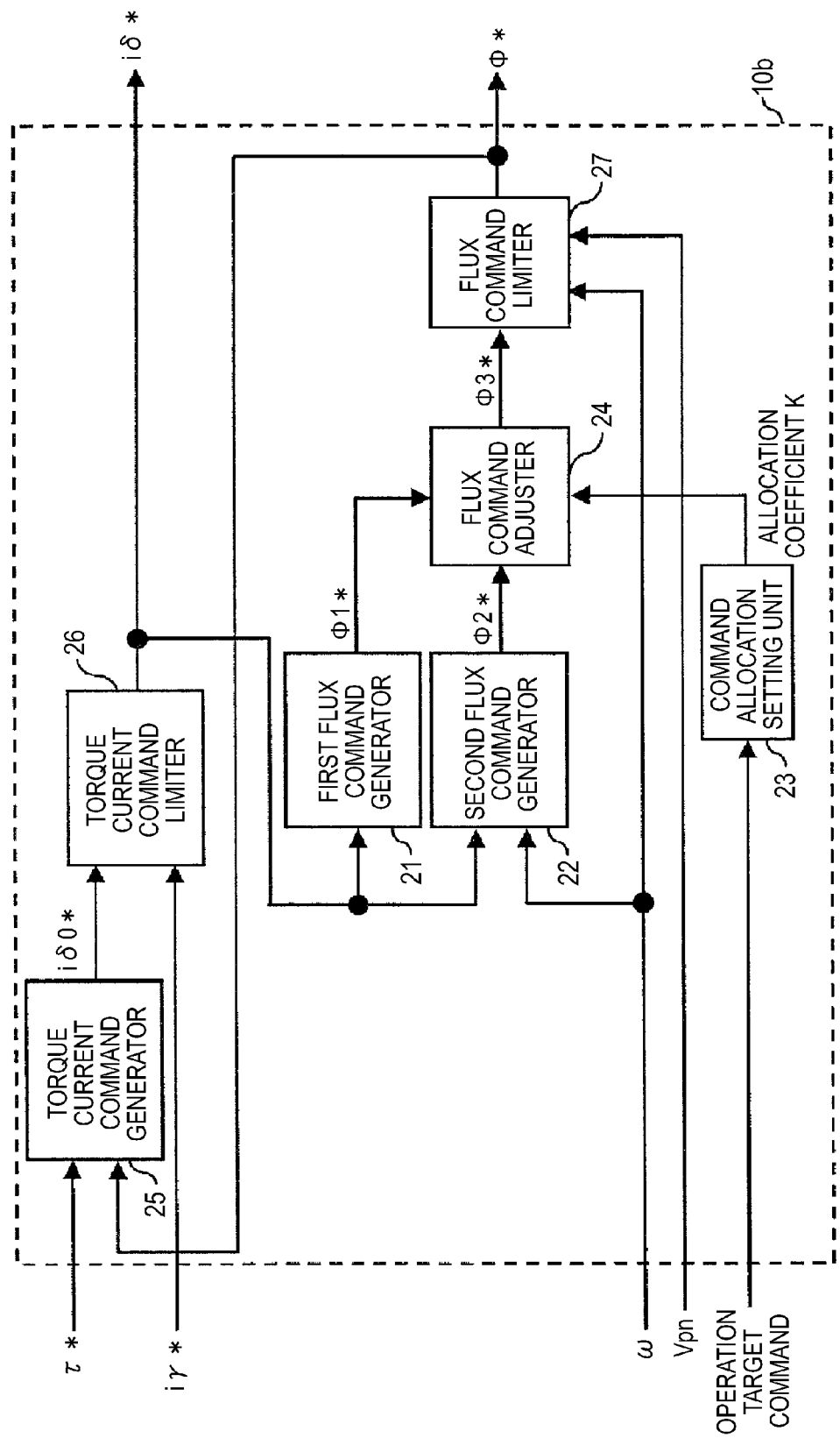
FIG. 16 is a view showing an example of a configuration of a control command generator shown in FIG. 15.
Figure 17:
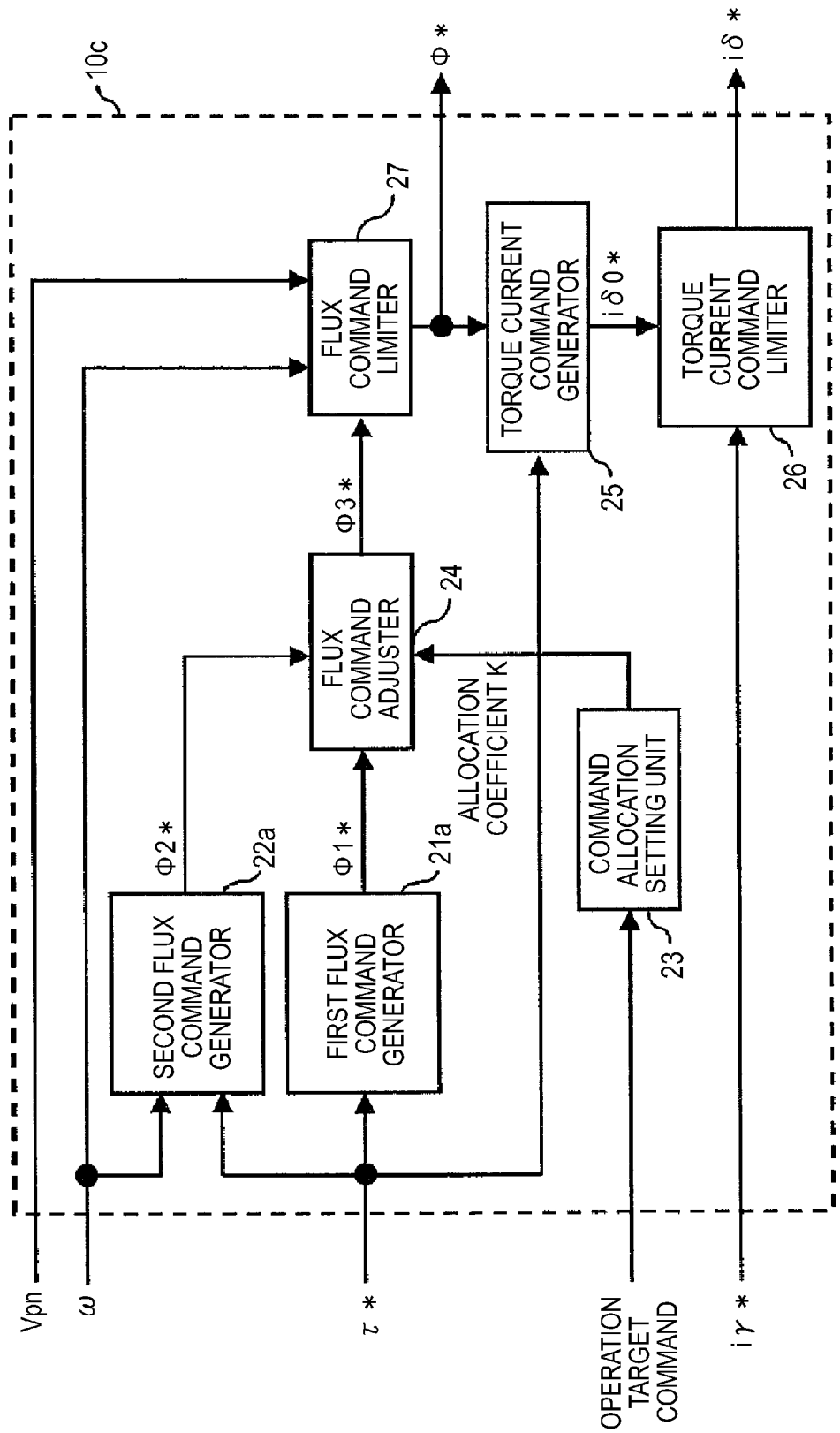
FIG. 17 is a view showing another example of the configuration of the control command generator shown in FIG. 15.

FIG. 16 is a view showing an example of the configuration of a control command generator 10b formed by adding a flux command limiter 27 to the control command generator 10 (see FIG. 9) described in the first embodiment above. FIG. 17 is a view showing an example of the configuration in which the flux command limiter 27 is added to the control command generator 10a (see FIG. 13) described in the first embodiment above. The configuration of the flux command limiter 27 is the same in FIG. 16 and FIG. 17. In these drawings, an armature interlinkage flux command before a limitation is imposed thereon by the flux command limiter 27 is denoted as $\Phi 3^*$ and an armature interlinkage flux command outputted from the flux command limiter 27 is denoted as $\Phi^*$ as distinguished from each other.

The power converter 4 has a maximum output voltage value Vmax (in terms of effective value) dependent on specifications of the power converter 4 and the power supply voltage Vpn. It is therefore necessary to limit the armature interlinkage flux command $\Phi^*$ so that an inductive voltage induced in the armature of the synchronous machine 1 is suppressed at or below the maximum output voltage value Vmax. By ignoring a voltage drop across the resistance R of the synchronous machine 1, the inductive voltage is determined by the product of the rotation speed $\omega$ of the synchronous machine 1 and the armature interlinkage flux $\Phi s$. Hence, a maximum flux command value $\Phi max$ according to the rotation speed $\omega$ of the synchronous machine 1 is computed constantly on the basis of the maximum output voltage value Vmax of the power converter 4 in accordance with Equation (34) below and a value found by limiting an output of the flux command adjuster 24 with the maximum value $\Phi max$ is given as the armature interlinkage command $\Phi^*$. In Equation (34) below, $\Delta V$ is a control margin voltage.

$$\Phi max = \frac{Vmax - R \cdot i\delta^* - \Delta V}{\omega} \cong \frac{Vmax - \Delta V}{\omega} \quad (34)$$

where $$Vmax = \frac{Vpn}{\sqrt{2}}$$

The above has described the synchronous machine control apparatus of the second embodiment. According to this embodiment, the upper limit of the armature interlinkage flux command is determined by the power supply voltage across the power supply 3 inputted into the power converter 4 and the rotation speed of the synchronous machine 1 and it is therefore necessary to control the armature interlinkage flux command to be at or below the upper limit. Hence, by limiting the armature interlinkage flux command adjusted to suit an operation target at or below the upper limit, in a case where the power converter 4 has a less than enough output voltage, there is an advantage that the armature interlinkage flux command suitable for an operation target can be always generated even when the operation target or the power supply voltage across the power supply 3 and the rotation speed of the synchronous machine 1 vary. Also, there is an advantage that the synchronous machine control system can be reduced in size because utilization of the power converter 4 can be improved.

Third Embodiment

Figure 18:
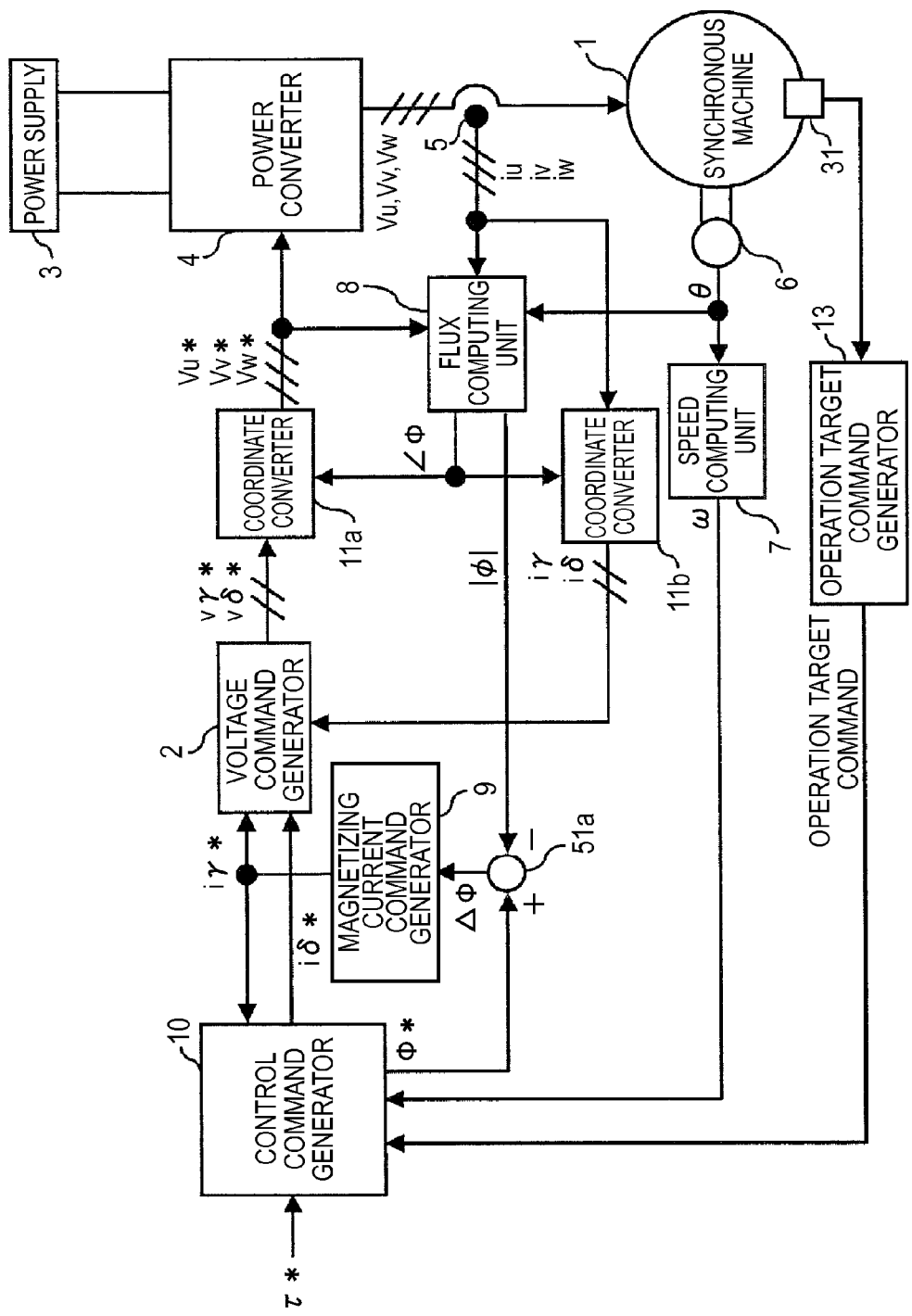
FIG. 18 is a view used to describe a synchronous machine control apparatus according to a third embodiment of the invention and showing a synchronous machine control system including a synchronous machine and a synchronous machine control apparatus.

A synchronous machine control apparatus according to a third embodiment of the invention will now be described in accordance with FIG. 18. FIG. 18 is a view used to describe the synchronous machine control apparatus of the third embodiment and it shows a synchronous machine control system including a synchronous machine and a synchronous machine control apparatus. Also, FIG. 19 shows another synchronous machine control system according to the third embodiment.

Figure 19:
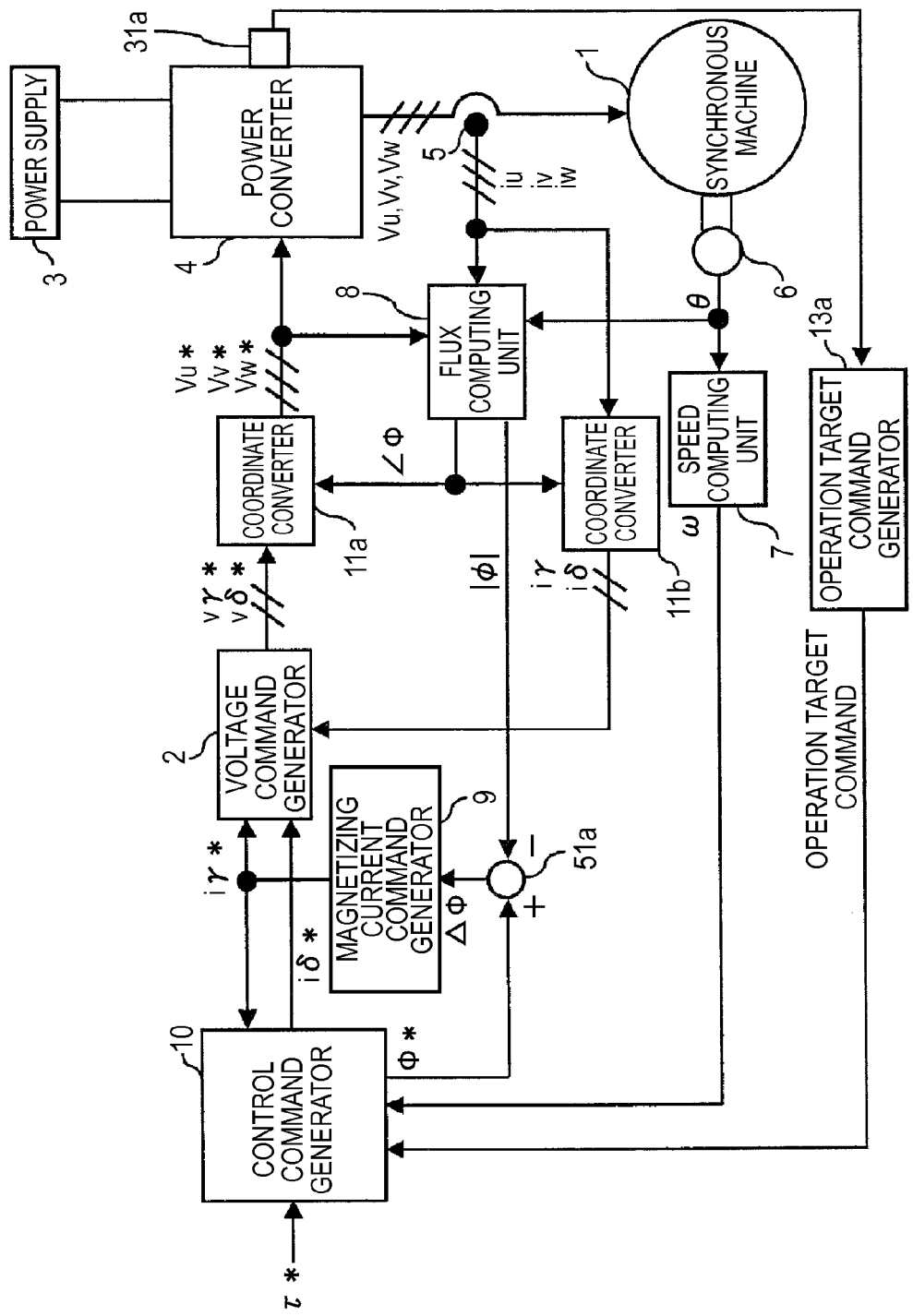
FIG. 19 is a view used to describe the synchronous machine control apparatus according to the third embodiment of the invention and showing another synchronous machine control system including a synchronous machine and a synchronous machine control apparatus.

As are shown in FIG. 18 and FIG. 19, the synchronous machine control apparatus of the third embodiment has a temperature detector 31 or 31a and an operation target command generator 13 or 13a. The operation target command is therefore generated in the operation target command generator 13 or 13a on the basis of the temperature detected by the temperature detector 31 or 31a, respectively. In the drawings of the third embodiment, two components, the voltage detector 12 and the flux command limiter 27, described in the second embodiment above are not shown. It should be appreciated, however, that these components may be added and the same can be said in fourth and following embodiments described below.

The synchronous machine 1 is set with a temperature (hereinafter, denoted as Tmomax) allowed in terms of insulation performance or in terms of securing magnet performance when the synchronous machine 1 is a permanent magnet synchronous machine. Hence, when the synchronous machine 1 is operated, it is preferable to operate the synchronous machine 1 at or below the allowable temperature. To this end, as is shown in FIG. 18, the temperature detector 31 is provided to a stator or a rotor of the synchronous machine 1 to detect a temperature. Then, the operation target command generator 13 generates the operation target command to perform a loss minimizing operation (conversion efficiency maximizing operation) to reduce heat generation in the synchronous machine 1, so that a temperature rise is suppressed on the basis of the detected temperature of the synchronous machine 1 when the temperature of the synchronous machine 1 is high.

As an example of the above method, when the detected temperature (denoted as Tmo) of the synchronous machine 1 exceeds a temperature Tmox (=Tmomax−ΔT) set lower than the allowable temperature Tmomax by a temperature margin (ΔT), the heat generation (loss) minimizing operation (conversion efficiency maximizing operation) for the synchronous machine 1 is performed. In this case, it is preliminarily configured in such a manner that the second flux command Φ2* instructing to minimize a total loss including an iron loss and a copper loss occurring in the armature winding of the synchronous machine 1 and a wire between the synchronous machine 1 and the power converter 4 is outputted for the torque current command iδ* (or the torque command τ*). Accordingly, when the temperature Tmo of the synchronous machine 1 exceeds the set temperature Tmox, the operation target command generator 13 generates the operation target command that forcedly sets the allocation coefficient K to 1.

Other preferred examples are as follows. In a case where a temperature of the armature winding of the synchronous machine 1 particularly becomes a problem, the temperature detector 31 may be provided in close proximity to the armature winding of the synchronous machine 1 to detect a temperature. Accordingly, when the detected temperature Tmo exceeds the set temperature Tmox, the operation target command generator 13 generates the operation target command that forcedly sets the allocation coefficient K to 0 to perform a copper loss (current) minimizing operation.

Further, in a case where the temperature detector 31 cannot be directly attached to the synchronous machine 1 because of a structure restriction, the temperature detector 31 may be provided to a point in close proximity to the synchronous machine 1 so that ambient temperature of the synchronous machine 1 is used in substitution for a temperature of the synchronous machine 1. In a case where a cooling device cooling the synchronous machine 1 is attached thereto, a temperature of the cooling device or a cooling medium, such as water, may be detected so that the detected temperature is used in substitution for a temperature of the synchronous machine 1. In comparison with a case where the temperature detector 31 is attached directly to the synchronous machine 1, temperature detection becomes less accurate. However, an advantage of the same quality can be achieved.

Also, the power converter 4 is set with a temperature (denoted as Tinmax) allowed in terms of characteristics of the switching device forming the power convert 4 and it is preferable to operate the power converter 4 so that a temperature of the power converter 4 is at or below the allowable temperature when the synchronous machine 1 is operated. To this end, as is shown in FIG. 19, the temperature detector 31a is provided to the power converter 4 to detect a temperature. Then, the operation target command generator 13a generates the operation target command to perform a heat (loss) minimizing (conversion efficiency maximizing) operation to reduce heat generation in the power converter 4, so that a temperature rise is suppressed on the basis of the detected temperature (denoted as Tin) of the power converter 4 when the temperature of the power converter 4 is high.

As an example of the above method, when a temperature Tin of the power converter 4 exceeds a temperature Tinx (=Tinmax−ΔT) set lower than the allowable temperature Tinmax by a temperature margin ΔT, a loss minimizing (conversion efficiency maximizing) operation for the power converter 4 is performed. In this case, it is necessary to minimize heat generation (loss) in the power converter 4, that is, to make a current outputted from the power converter 4 to the synchronous machine 1, that is the armature current of the synchronous machine 1, as small as possible. Accordingly, the operation target command generator 13a generates the operation target command that forcedly sets the allocation coefficient K to 0 to perform the current minimizing operation.

Further, in a case where the temperature detector 31a cannot be attached directly to the power converter 4 because of a structure restriction, the temperature detector 31a may be provided to a point in close proximity to the power converter 4 so that ambient temperature of the power converter 4 is used in substitution for a temperature of the power converter 4. In a case where a cooling device cooling the power converter 4 is attached thereto, a temperature of the cooling device or a cooling medium, such as water, may be detected, so that the detected temperature is used in substitution for a temperature of the power converter 4. In comparison with a case where the temperature detector 31a is attached directly to the power converter 4, temperature detection becomes less accurate. However, an advantage of the same quality can be achieved.

Also, although it is not shown in the drawings, the temperature detectors 31 and 31a may be provided to the synchronous machine 1 and the power converter 4, respectively, so that the operation target command is generated on the basis of the detected temperatures of the respective detectors. As an example of this method, a difference between the detected temperature Tmo and the allowable temperature Tmox of the synchronous machine 1 and a difference between the detected temperature Tin and the allowable temperature Tinx of the power converter 4 are compared, and the operation target command is generated by placing a higher priority to one of the detectors whichever has the smaller difference. When differences between the detected temperatures and the allowable temperatures are compared, it is also possible to perform a process to assign weights to each difference value by multiplying each by a coefficient that differs with a priority.

The above has described the synchronous machine control apparatus of the third embodiment. According to this embodiment, by providing the temperature detector 31 to the stator or the rotor of the synchronous machine 1 to detect a temperature and generating the operation target command on the basis of the detected temperature of the synchronous machine 1, there can be achieved an advantage that the synchronous machine 1 can be driven while suppressing heat generation and a loss in the synchronous machine 1 by generating an operation target command to generate an armature interlinkage command instructing to reduce heat generation in the synchronous machine 1 when the temperature of the synchronous machine 1 is high. Also, by providing the temperature detector 31a to the power converter 4 to detect a temperature and generating the operation target command on the basis of the detected temperature of the power converter 4, there can be achieved an advantage that the synchronous machine 1 can be driven while suppressing heat generation and a loss in the power converter 4 by generating an operation target command to generate an armature interlinkage flux command instructing to reduce heat generation in the power converter 4 when the temperature of the power converter 4 is high.

Fourth Embodiment

Figure 20:
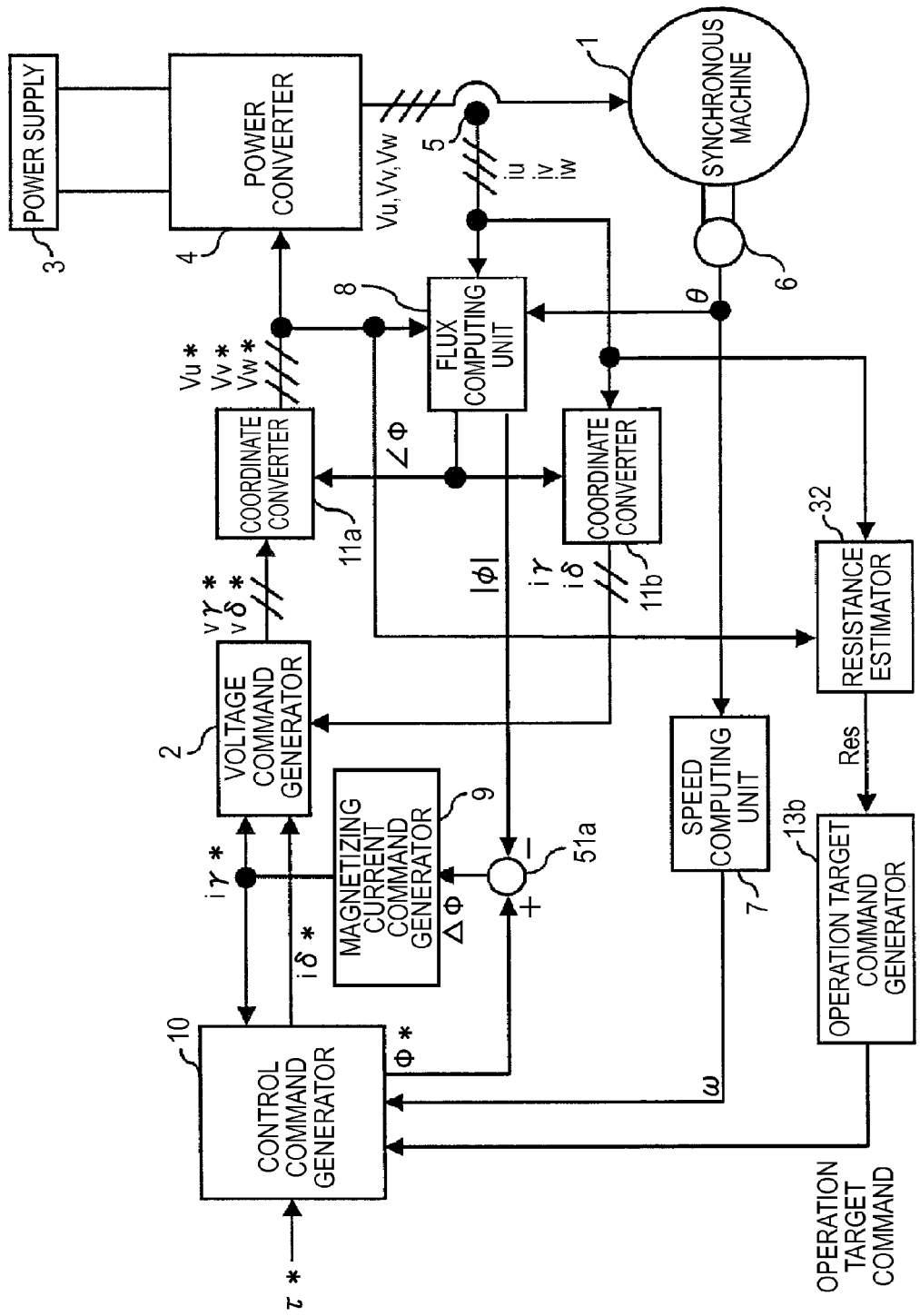
FIG. 20 is a view used to describe a synchronous machine control apparatus according to a forth embodiment of the invention and showing a synchronous machine control system including a synchronous machine and a synchronous machine control apparatus.

A synchronous machine control apparatus according to a fourth embodiment of the invention will now be described in accordance with FIG. 20. FIG. 20 is a view used to describe the synchronous machine control apparatus of the fourth embodiment and it shows a synchronous machine control system including a synchronous machine and a synchronous machine control apparatus.

As is shown in FIG. 20, the synchronous machine control apparatus of the fourth embodiment is provided with a resistance estimator 32 that estimates magnitude of resistance of the synchronous machine 1 on the basis of an armature current and a voltage command, and an operation target command generator 13c generates an operation target command on the basis of the estimated resistance value of the synchronous machine 1 estimated by the resistance estimator 32.

A resistance value of the resistance R of the synchronous machine 1 varies with a temperature (as has been described above, this resistance is chiefly the resistance of the armature winding of the synchronous machine 1 and in a case where influences of wiring resistance between the synchronous machine 1 and the power converter 4 is not negligibly small, the wiring resistance is also taken into consideration). Hence, by utilizing this property, instead of using the temperature detector 31 as in the third embodiment above, magnitude of the resistance R of the synchronous machine 1 may be estimated by the resistance estimator 32, so that a value equivalent to a temperature of the synchronous machine 1 is estimated on the basis of this estimated resistance value (denoted as Res).

As a method of estimating magnitude of the resistance R of the synchronous machine 1, the power converter 4 applies a DC voltage to the respective phases (for example, given Edc as a predetermined DC amount, then the voltage command generator 2 generates voltage commands such that Vu*=Edc, Vv*=Vw*=−Edc/2). The current detector 5 detects the armature currents iu, iv, and iw in this instance. Then, the resistance estimator 32 estimates magnitude of the resistance R, Res, of the synchronous machine 1 on the basis of the voltage command and the armature current by a computation in accordance with Equation (35) as follows.

$$Res=Vu^*/iu \tag{35}$$

In Equation (35) above, Res=Vv*/iv or Res=Vw*/iw may be used. However, the magnitude can be estimated more accurately without influences of a disturbance as a larger DC voltage is applied to the phases. It is therefore suitable to estimate the magnitude Res using the phase u in this example.

An operation target command generator 13b generates the operation target command by finding a temperature (equivalence) of the synchronous machine 1 on the basis of the estimated resistance value Res.

To convert the estimated resistance value Res to a value equivalent to the temperature of the synchronous machine 1, a correlation of the estimated resistance value Res and a temperature of the synchronous machine 1 is pre-stored in the form of an equation or table data. When configured in this manner, it becomes possible to find a temperature (equivalence) of the synchronous machine 1 without having to use the temperature detector 31. Once the temperature (equivalence) of the synchronous machine 1 is found, the operation target command is generated according to the method described in the third embodiment above (it goes without saying that the estimated resistance value Res and the operation target command can be correlated directly in advance).

It should be noted, however, that a DC voltage is outputted from the power converter 4 when resistance of the synchronous machine 1 is estimated by this method. Hence, this method is suitable when an armature interlinkage flux command at the start of driving is set by estimating resistance using the resistance estimator 32 before the synchronous machine 1 is driven rather than while the synchronous machine 1 is driven.

The above has described the synchronous machine control apparatus of the fourth embodiment. According to this embodiment, by estimating the resistance of the synchronous machine 1 by the resistance estimator 32 and generating the operation target command on the basis of the estimated resistance value of the synchronous machine 1 thus estimated, there can be achieved an advantage that the synchronous machine 1 can be driven while suppressing heat generation and a loss in the synchronous machine 1 by generating an operation target command to generate an armature interlinkage flux command instructing to reduce heat generation in the synchronous machine 1 when the temperature of the synchronous machine 1 is high, in particular, at the start of the driving of the synchronous machine 1.

Fifth Embodiment

Figure 21:
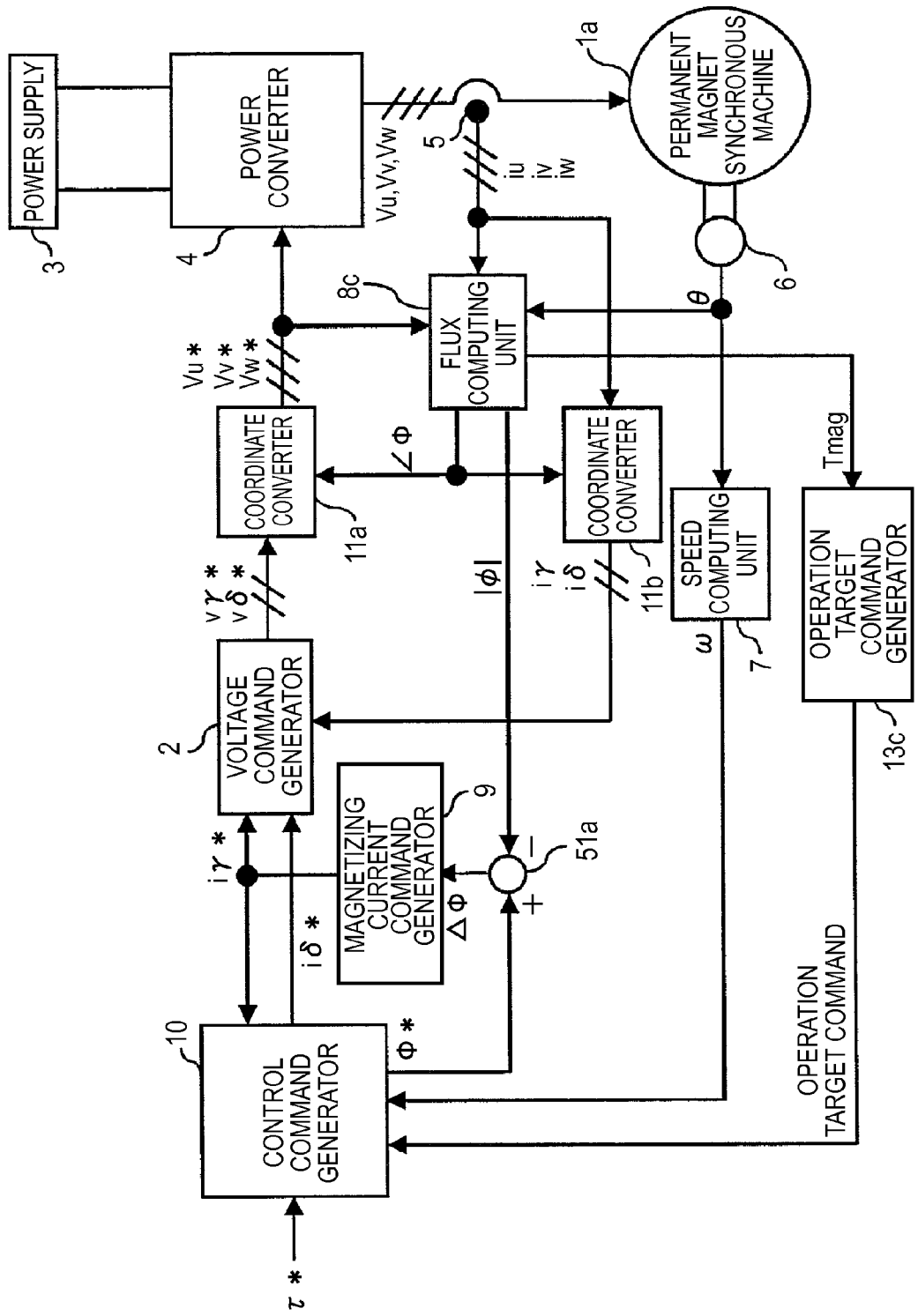
FIG. 21 is a view used to describe a synchronous machine control apparatus according to a fifth embodiment of the invention and showing a synchronous machine control system including a synchronous machine and a synchronous machine control apparatus.

A synchronous machine control apparatus according to a fifth embodiment of the invention will now be described in accordance with FIG. 21. FIG. 21 is a view used to describe the synchronous machine control apparatus of the fifth embodiment and it shows a synchronous machine control system including a synchronous machine and a synchronous machine control apparatus.

As is shown in FIG. 21, the synchronous machine control apparatus of the fifth embodiment includes a permanent magnet synchronous machine 1a as the synchronous machine and a flux computing unit 8c estimates a temperature of the permanent magnet of the permanent magnet synchronous machine 1a and generates the operation target command on the basis of the temperature of the permanent magnet thus estimated.

Characteristics of the permanent magnet used in the permanent magnet synchronous machine 1a vary from type to type. However, in general, a magnet flux generated by the permanent magnet varies with a temperature and the permanent magnet has a property that the permanent magnet degausses as it becomes hotter. By utilizing this property instead of using the temperature detector 31 as in the third embodiment above, the flux computing unit 8c estimates a temperature of the permanent magnet of the permanent magnet synchronous machine 1a and uses the estimated temperature of the permanent magnet as a value equivalent to the temperature of the synchronous machine 1.

The flux computing units 8, 8a, and 8b in the synchronous machine control apparatus of the first embodiment above estimate the d-axis component pd0 of the estimated armature interlinkage flux. As is expressed as Equation (2) above, the d-axis component Φd of the actual armature interlinkage flux can be resolved to fluxes Ld and id generated by the permanent magnet flux Φm and the d-axis current id. The fluxes Ld and id generated by the d-axis current id are thought to have small temperature dependence. Hence, the permanent magnet flux can be found by removing the values of the fluxes Ld and id from the d-axis component pd0 of the estimated armature interlinkage flux. By comparing the permanent magnet flux found by the computation above with a temperature characteristic of the permanent magnet flux found in advance, a temperature of the permanent magnet can be estimated. This estimated temperature is denoted as Tmag. To convert the permanent magnet flux found as above to the estimated temperature Tmag, a correlation of the permanent magnet flux and the temperature of the permanent magnet is pre-stored in the form of an equation or table data.

It is known, however, that although the d-axis inductance has small temperature dependence, it is known that a value thereof varies with an output current of the permanent magnet synchronous machine 1a due to magnetic saturation as described above. Hence, by configuring in such a manner that a relation between the output current and the d-axis inductance is pre-stored in the form of an equation or a table and an error in flux estimation caused by an inductance fluctuation is reduced by varying the inductance with the output current, it becomes possible to improve estimation accuracy of the temperature of the permanent magnet.

When configured in this manner, it becomes possible to find the estimated temperature Tmag of the permanent magnet of the permanent magnet synchronous machine 1a without having to use the temperature detector 31. Hence, flux computing unit 8c of this embodiment is of the configuration obtained by adding the permanent magnet temperature estimating mechanism as above to the flux computing units 8, 8a, and 8b in the synchronous machine control apparatuses of the first through fourth embodiments above.

Given the estimated temperature Tmag of the permanent magnet of the permanent magnet synchronous machine 1a as a temperature (equivalence) of the synchronous machine 1, then the operation target command generator 13c generates the operation target command according to the method described in the third embodiment above. However, from the viewpoint of securing the magnet performance, in a case where a higher priority is placed on the securing of the magnet performance and preventing of degaussing than torque accuracy (for example, in a case where there is considerable degaussing with a temperature rise of the permanent magnet), it is more preferable to adopt a method by which the torque command is limited when a (estimated) temperature of the permanent magnet rises, so that a further temperature rise is suppressed by suppressing an output torque of the permanent magnet synchronous machine 1a, that is, an armature current necessary to generate a torque.

Figure 22:
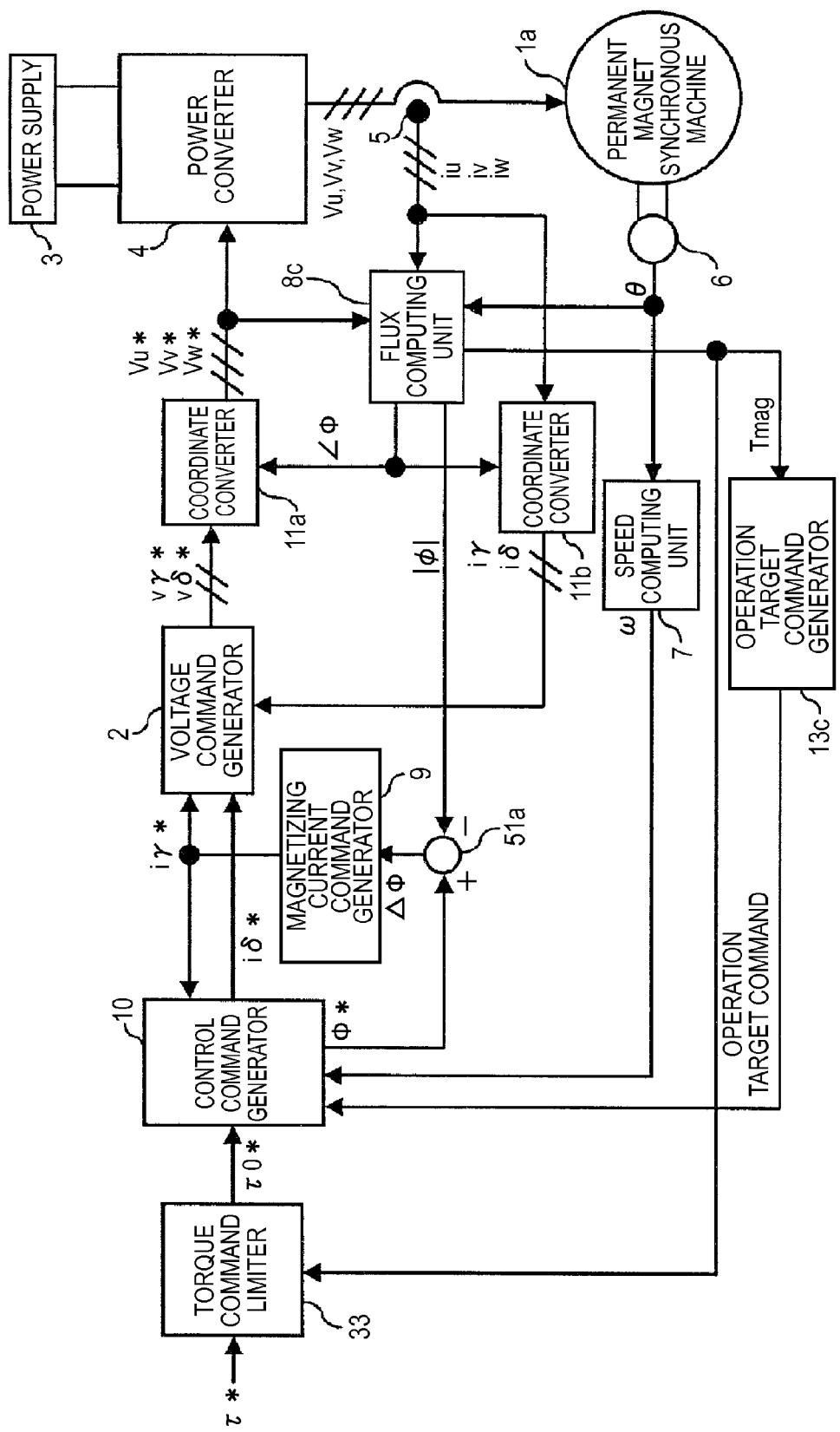
FIG. 22 is a view used to describe the synchronous machine control apparatus according to the fifth embodiment of the invention and showing another synchronous machine control system including a synchronous machine and a synchronous machine control apparatus.

FIG. 22 is a view showing another example of the fifth embodiment. It is a view showing a configuration of a synchronous machine control system including the permanent magnet synchronous machine 1a and a synchronous machine control apparatus in which a torque command limiter 33 is provided. This configuration is provided with the torque command limiter 33 that sets a predetermined torque limit τlim* on the basis of the estimated temperature Tmag of the permanent magnet to limit the toque command τ*. In FIG. 22, a torque command before a limitation is imposed thereon by the torque command limiter 33 is denoted as τ* and a torque command outputted from the torque command limiter 33 is denoted as τ0* as distinguished from each other.

Alternatively, the torque command may be limited on the basis of the temperature of the synchronous machine 1 detected by the temperature detector 31 as in the third embodiment above.

The above has described the synchronous machine control apparatus of the fifth embodiment. According to this embodiment, by generating the operation target command to generate an armature interlinkage flux command instructing to reduce heat generation in the permanent magnet synchronous machine 1a when the estimated temperature of the permanent magnet of the permanent magnet synchronous machine 1a is high, there can be achieved an advantage that the synchronous machine 1 can be driven while suppressing heat generation and a loss in the permanent magnet synchronous machine 1a. Also, by limiting a torque outputted from the permanent magnet synchronous machine 1a when the estimated temperature of the permanent magnet of the permanent magnet synchronous machine 1a is high, there can be achieved an advantage that it becomes possible to prevent degaussing of the permanent magnet by suppressing a temperature rise of the permanent magnet.

Sixth Embodiment

Figure 23:
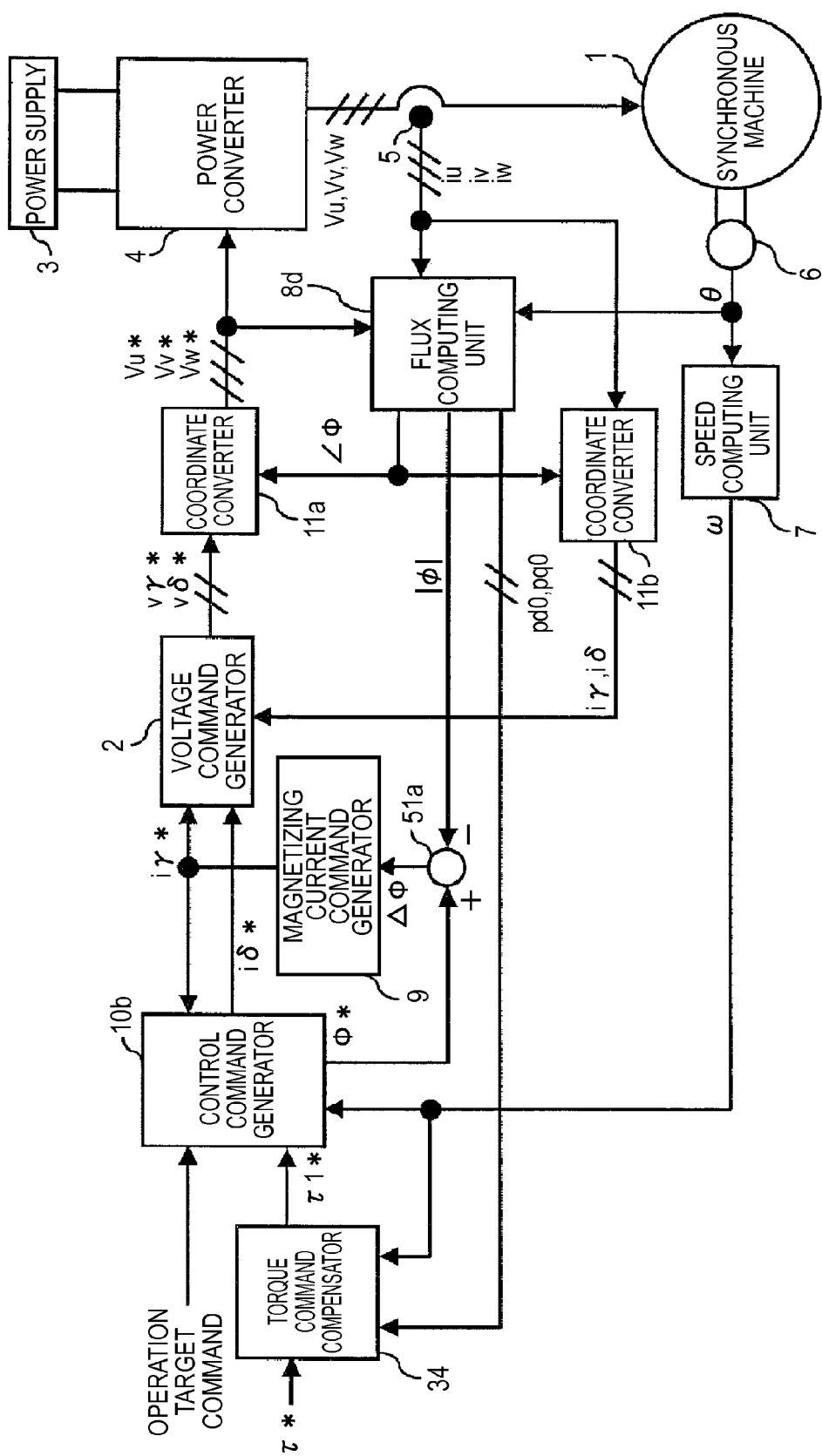
FIG. 23 is a view used to describe a synchronous machine control apparatus according to a sixth embodiment of the invention and showing a synchronous machine control system including a synchronous machine and a synchronous machine control apparatus.

A synchronous machine control apparatus according to a sixth embodiment of the invention will now be described in accordance with FIG. 23. FIG. 23 is a view used to describe the synchronous machine control apparatus of the sixth embodiment and it shows a synchronous machine control system including a synchronous machine and a synchronous machine control apparatus.

As is shown in FIG. 23, the synchronous machine control apparatus of the sixth embodiment is additionally provided with a torque command compensator 34 that computes a torque command compensation amount Δτ with respect to a torque command τ* on the basis of a rotation speed ω of the synchronous machine 1 and the estimated armature interlinkage flux (d-axis component pd0 and q-axis component pq0) and adds or subtracts the torque command compensation amount Δτ to or from the torque command τ. In FIG. 23, a torque command before compensation by the torque command compensator 34 is denoted as τ* and a torque command outputted from the torque command compensator 34 is denoted as τ1* as distinguished from each other.

A flux computing unit 8d of the sixth embodiment is any of the flux computing units 8, 8a, 8b, and 8c in the synchronous machine control apparatuses of the first through fifth embodiments above configured to output estimated armature interlinkage fluxes pd0 and pq0 on the d-q axes. Hence, the flux computing unit 8d is equivalent to the flux computing units 8, 8a, 8b, and 8c in terms of functions and contents of the computing process.

In a suitable synchronous machine control system, the torque command τ* and a torque τ outputted from the synchronous machine 1 should be consistent with each other. However, not all the power inputted into the synchronous machine 1 from the power converter 4 is not converted to a torque in the synchronous machine 1 and a part of the power is released as heat energy in the form of an iron loss including an overcurrent loss and a hysteresis loss in the synchronous machine 1 or a mechanical loss or a windage loss. In a case where these losses are noticeable, a torque τ that the synchronous machine 1 outputs for the torque command τ* is decreased. In order to overcome such an inconvenience, a torque comparable to these losses is compensated for with respect to the torque command τ*, so that the torque command τ* and the torque τ outputted from the synchronous machine 1 become consistent with each other.

The sixth embodiment will chiefly describe a method of making a compensation for a torque decreased by an iron loss including an overcurrent loss and a hysteresis loss, a mechanical loss, and a windage loss. It should be appreciated, however, that a compensation may be made for a torque decreased due to factors other than these losses.

Regarding an iron loss, it is known that a hysteresis loss is proportional to a rotation speed ω of the synchronous machine 1 and an overcurrent loss is proportional to a square of the rotation speed ω. Also, an iron loss is dependent on the armature interlinkage flux. Hence, let Wi be an estimated iron loss value, then Wi can be found by creating an equation using an iron loss Wi as a function of the estimated armature interlinkage fluxes pd0 and pq0 on the d-q axes and the rotation speed ω as expressed by Equation (36) as follows.

$$Wi = f(\omega, pd0, pq0) \quad (36)$$

In a case where a function in Equation (36) above is simplified by allowing a slight deterioration of computation accuracy, an equation may be created by using an iron loss Wi as a function of an absolute value $|\Phi|$ of the estimated armature interlinkage flux and the rotation speed $\omega$ as expressed as Equation (37) as follows.

$$Wi = f(\omega, |\Phi|) \tag{37}$$

It is known that a mechanical loss and a windage loss can be expressed as a function of the rotation speed $\omega$ of the synchronous machine 1. Hence, let Wm be an estimated value of these losses, then Wm can be found by creating an equation using Wm as a function of $\omega$ as expressed as Equation (38) as follows.

$$Wm = f(\omega) \tag{38}$$

To express these losses as Equations (36) through (38) above, losses may be preliminarily found using a known field analysis tool or by actual measurement. In short, losses can be found in any manner.

Once an iron loss Wi as well as a mechanical loss and a windage loss, Wm are estimated, a torque command compensation amount $\Delta\tau$ to be compensated for with respect to the torque command $\tau^*$ in the torque command compensator 34 can be expressed as Equation (39) below and an output $\tau 1^*$ of the torque command compensator 34 can be expressed as Equation (40) below.

$$\Delta\tau = \frac{Pm}{\omega}(Wi + Wm) \tag{39}$$

where $\omega$ is an electrical angle.

$$\tau 1^* = \tau^* + \Delta\tau \tag{40}$$

It should be noted that it is possible to add the configuration of the sixth embodiment to any one of the first through fifth embodiments above.

The above has described the synchronous machine control apparatus of the sixth embodiment. According to this embodiment, the torque command compensator 34 can compute an error between a torque command and an output torque occurring due to a synchronous machine loss, such as an iron loss generated in the synchronous machine 1 and make a compensation for the error. Hence, there can be achieved an advantage that torque control accuracy can be improved.

While the first through sixth embodiments of the invention have been described, it should be appreciated that various modifications and alterations of this invention will be apparent to those skilled in the art without departing from the scope and spirit of this invention, and it should be understood that this is not limited to the illustrative embodiments set forth herein.

What is claimed is:

1. A synchronous machine control apparatus that controls an armature current of a synchronous machine on two axes including a γ axis in a generation direction of an armature interlinkage flux of the synchronous machine and a δ axis orthogonal to the γ axis, comprising:
a voltage command generator that generates a voltage command according to a magnetizing current command as a current command in the γ-axis direction and a torque current command as a current command in the δ-axis direction;
a power converter that converts a voltage across a power supply and applies the resulting voltage to the synchronous machine according to the voltage command;
a current detector that detects the armature current of the synchronous machine;
a position detector that makes one of an estimation and a detection of a rotor position of the synchronous machine;
a speed computing unit that computes a rotation speed of the synchronous machine on the basis of the rotor position;
a flux computing unit that estimates an estimated armature interlinkage flux of the synchronous machine on the basis of the armature current and the voltage command;
a magnetizing current command generator that generates the magnetizing current command on the basis of a difference between an armature interlinkage flux command and the estimated armature interlinkage flux; and
a control command generator that generates the armature interlinkage flux command and the torque current command according to a torque command, the rotation speed, and an operation target command,
wherein the control command generator includes:
a first flux command generator that generates a first flux command according to one of the torque command and the torque current command;
a second flux command generator that generates a second flux command according to one of the torque command and the torque current command, and the rotation speed;
a command allocation setting unit that sets an allocation coefficient equivalent to an allocation ratio of two flux commands including the first flux command and the second flux command according to the operation target command;
a flux command adjuster that outputs the armature interlinkage flux command according to the two flux commands and the allocation coefficient; and
a torque current command generator that generates the torque current command according to the torque command and the armature interlinkage flux command.

2. The synchronous machine control apparatus according to claim 1, further comprising:
a temperature detector that detects a temperature of the synchronous machine,
wherein the operation target command is generated on the basis of the temperature of the synchronous machine detected by the temperature detector.

3. The synchronous machine control apparatus according to any one of claim 1, further comprising:
a temperature detector that detects a temperature of the power converter,
wherein the operation target command is generated on the basis of the temperature of the power converter detected by the temperature detector.

4. The synchronous machine control apparatus according to claim 1, further comprising:
a resistance estimator that estimates magnitude of resistance of the synchronous machine on the basis of the armature current and the voltage command,
wherein the operation target command is generated on the basis of an estimated resistance value of the synchronous machine estimated by the resistance estimator.

5. The synchronous machine control apparatus according to claim 1, wherein:
the synchronous machine is formed of a permanent magnet synchronous machine;
the flux computing unit estimates a temperature of a permanent magnet of the synchronous machine; and
the operation target command is generated on the basis of the estimated temperature of the permanent magnet.

6. The synchronous machine control apparatus according to claim 1, wherein:
the synchronous machine is formed of a permanent magnet synchronous machine;
the flux computing unit estimates a temperature of a permanent magnet of the synchronous machine;
the operation target command is generated on the basis of the estimated temperature of the permanent magnet; and
the torque command is limited according to the estimated temperature of the permanent magnet.

7. The synchronous machine control apparatus according to any one of claim 1, wherein:
a torque command compensation amount with respect to the torque command is computed on the basis of the rotation speed and the estimated armature interlinkage flux, and the torque command compensation amount is added to and subtracted from the torque command.

8. A synchronous machine control apparatus that controls an armature current of a synchronous machine on two axes including a γ axis in a generation direction of an armature interlinkage flux of the synchronous machine and a δ axis orthogonal to the γ axis, comprising:
a voltage command generator that generates a voltage command according to a magnetizing current command as a current command in the γ-axis direction and a torque current command as a current command in the δ-axis direction;
a power converter that converts a voltage across a power supply and applies the resulting voltage to the synchronous machine according to the voltage command;
a current detector that detects the armature current of the synchronous machine;
a position detector that makes one of an estimation and a detection of a rotor position of the synchronous machine;
a speed computing unit that computes a rotation speed of the synchronous machine on the basis of the rotor position;
a flux computing unit that estimates an estimated armature interlinkage flux of the synchronous machine on the basis of the armature current and the voltage command;
a magnetizing current command generator that generates the magnetizing current command on the basis of a difference between an armature interlinkage flux command and the estimated armature interlinkage flux; and
a control command generator that generates the armature interlinkage flux command and the torque current command according to a torque command, the rotation speed, and an operation target command,
wherein the control command generator includes:
a first flux command generator that generates a first flux command according to one of the torque command and the torque current command;
a second flux command generator that generates a second flux command according to one of the torque command and the torque current command, and the rotation speed;
a command allocation setting unit that sets an allocation coefficient equivalent to an allocation ratio of two flux commands including the first flux command and the second flux command according to the operation target command;
a flux command adjuster that outputs the armature interlinkage flux command according to the two flux commands and the allocation coefficient;
a torque current command generator that generates the torque current command according to the torque command and the armature interlinkage flux command; and
a flux command limiter that imposes a limitation on the armature interlinkage flux command on the basis of the rotation speed and the voltage across the power supply.

9. The synchronous machine control apparatus according to claim 8, further comprising:
a temperature detector that detects a temperature of the synchronous machine,
wherein the operation target command is generated on the basis of the temperature of the synchronous machine detected by the temperature detector.

10. The synchronous machine control apparatus according to any one of claim 8, further comprising:
a temperature detector that detects a temperature of the power converter,
wherein the operation target command is generated on the basis of the temperature of the power converter detected by the temperature detector.

11. The synchronous machine control apparatus according to claim 8, further comprising:
a resistance estimator that estimates magnitude of resistance of the synchronous machine on the basis of the armature current and the voltage command,
wherein the operation target command is generated on the basis of an estimated resistance value of the synchronous machine estimated by the resistance estimator.

12. The synchronous machine control apparatus according to claim 8, wherein:
the synchronous machine is formed of a permanent magnet synchronous machine;
the flux computing unit estimates a temperature of a permanent magnet of the synchronous machine; and
the operation target command is generated on the basis of the estimated temperature of the permanent magnet.

13. The synchronous machine control apparatus according to claim 8, wherein:
the synchronous machine is formed of a permanent magnet synchronous machine;
the flux computing unit estimates a temperature of a permanent magnet of the synchronous machine;
the operation target command is generated on the basis of the estimated temperature of the permanent magnet; and
the torque command is limited according to the estimated temperature of the permanent magnet.

14. The synchronous machine control apparatus according to any one of claim 8, wherein:
a torque command compensation amount with respect to the torque command is computed on the basis of the rotation speed and the estimated armature interlinkage flux, and the torque command compensation amount is added to and subtracted from the torque command.

* * * * *